US011772643B1

(12) United States Patent
Packer et al.

(10) Patent No.: US 11,772,643 B1
(45) Date of Patent: Oct. 3, 2023

(54) OBJECT RELEVANCE DETERMINATION

(71) Applicant: Zoox, Inc., Foster City, CA (US)

(72) Inventors: Jefferson Bradfield Packer, San Francisco, CA (US); Lichao Ma, Santa Clara, CA (US)

(73) Assignee: Zoox, Inc., Foster City, CA (US)

( * ) Notice: Subject to any disclaimer, the term of this patent is extended or adjusted under 35 U.S.C. 154(b) by 280 days.

(21) Appl. No.: 16/417,260

(22) Filed: May 20, 2019

(51) Int. Cl.
*B60W 30/09* (2012.01)
*G06V 20/58* (2022.01)
*B60W 30/095* (2012.01)
*G06V 20/56* (2022.01)

(52) U.S. Cl.
CPC ........ *B60W 30/0956* (2013.01); *B60W 30/09* (2013.01); *G06V 20/58* (2022.01); *G06V 20/588* (2022.01)

(58) Field of Classification Search
CPC .............. B60W 30/0956; B60W 30/09; G06K 9/00798; G06K 9/00805
USPC ......................................................... 701/28
See application file for complete search history.

(56) References Cited

U.S. PATENT DOCUMENTS

| 10,216,189 | B1* | 2/2019 | Haynes | B60W 60/00276 |
| 10,649,464 | B2* | 5/2020 | Gray | G05D 1/0088 |
| 10,915,762 | B1* | 2/2021 | Russell | G06V 20/58 |
| 2018/0082587 | A1* | 3/2018 | Wan | B60W 50/14 |
| 2018/0150080 | A1* | 5/2018 | Gross | G05D 1/0217 |
| 2018/0150081 | A1* | 5/2018 | Gross | G05D 1/0217 |
| 2019/0126930 | A1* | 5/2019 | Kim | G01C 21/32 |
| 2019/0176684 | A1* | 6/2019 | Zych | G06V 20/58 |
| 2020/0099739 | A1* | 3/2020 | Boehm | H04L 67/12 |
| 2020/0099793 | A1* | 3/2020 | Adams | H04M 9/087 |
| 2021/0215490 | A1* | 7/2021 | Mishra | G01C 21/3415 |

FOREIGN PATENT DOCUMENTS

JP 2009012602 * 1/2009

OTHER PUBLICATIONS

Urmson, Chris, How a Driverless Car Sees the Road, Mar. 2015, TED (https://www.ted.com/talks/chris_urmson_how_a_driverless_car_sees_the_road?language=en) (Year: 2015).*
Chris Urmson, How a Driverless Car Sees the Road, Mar. 2015, TED (Year: 2015).*

* cited by examiner

*Primary Examiner* — Elaine Gort
*Assistant Examiner* — Matthias S Weisfeld
(74) *Attorney, Agent, or Firm* — Lee & Hayes, P.C.

(57) ABSTRACT

A vehicle computing system may implement techniques to determine relevance of objects detected in an environment to a vehicle operating in the environment (e.g., whether an object could potentially impact the vehicle's ability to safely travel). The techniques may include determining an initial location and trajectory associated with a detected object and determining whether the detected object may intersect a path polygon (e.g., planned path with a safety buffer) of the vehicle. A path intersection may include the detected object intersecting the path polygon or sharing a road segment with the vehicle at a substantially similar height as the vehicle (e.g., on a similar plane). Based on a determination that the detected object does not intersect the planned path of the vehicle, the vehicle computing system may determine that the detected object is irrelevant to the vehicle and may disregard the detected object in vehicle control planning considerations.

20 Claims, 6 Drawing Sheets

OBJECT RELEVANCE DETERMINATION

BACKGROUND

Planning systems in autonomous and semi-autonomous vehicles determine actions for a vehicle to take in an operating environment. Actions for a vehicle may be determined based in part on avoiding objects present in the environment. For example, an action may be generated to go around a double-parked vehicle, to change a lane to avoid another vehicle in the road, to yield to a pedestrian, or the like. The planning systems may perform a series of simulations to determine an effect of each detected object on a potential action for the vehicle. However, in environments with a large number of objects, performing simulations including each detected object may be computationally costly and, in some cases, impossible with onboard computing capabilities.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
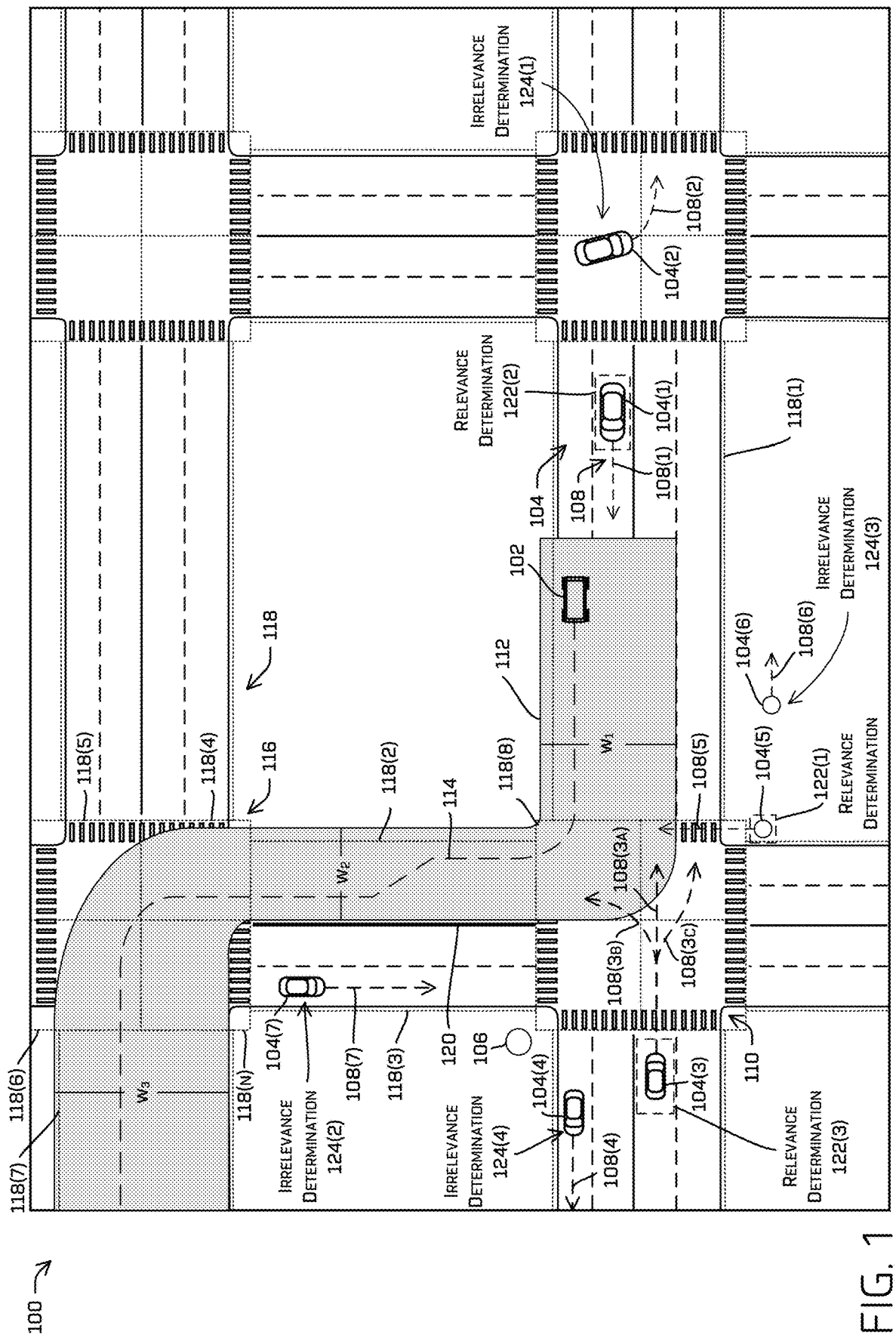
FIG. 1 is an illustration of an autonomous vehicle in an environment, in which an example object relevance system may determine whether objects in the environment may be relevant to vehicle planning operations.

This disclosure is directed to techniques for dynamically determining relevance of objects to a vehicle in an environment. Objects determined not to be relevant to the vehicle may be omitted or excluded from computations (simulations, estimated states, interaction modeling, collision estimation, etc.) to reduce computational load during vehicle planning. In at least some examples, excluding data associated with irrelevant objects in an environment can be used to reduce computation loads of vehicle computing systems by 5-30%. An object may be relevant to the vehicle if the object may potentially impact travel of the vehicle in the environment. For example, an object may be determined to be relevant to the vehicle based on the object and vehicle potentially sharing a same section of road or crossing paths at some point in the future.

The vehicle may include an autonomous or semi-autonomous vehicle with a vehicle computing system configured to detect one or more objects in the environment. The objects may include static objects (e.g., buildings, bridges, signs, etc.) and/or dynamic objects such as other vehicles (e.g., cars, trucks, motorcycles, mopeds, etc.), pedestrians, bicyclists, or the like. The techniques described herein apply to detecting the relevance of dynamic objects and, unless indicated to the contrary, the term "object" herein refers to a dynamic object. In some examples, the objects may be detected based on sensor data from one or more sensors (e.g., cameras, motion detectors, lidar, radar, etc.) of the vehicle. In some examples, the objects may be detected based on sensor data received from remote sensors, such as, for example, sensors associated with another vehicle or sensors mounted in the environment that are configured to share data with the vehicle computing system.

The vehicle computing system may be configured to determine an initial position of each detected object. In various examples, the vehicle computing system may also receive map data of the surrounding environment. Using the map data and the position information, the vehicle computing system may determine a location of each of the entities in the map. For example, the vehicle computing system may determine a portion of a road network (e.g., a road segment, an intersection, a traffic lane, etc.) in which the entity is located. In such an example, the portion of the road network may represent a section of a road (e.g., drivable surface) within the road network in which the vehicle may operate autonomously. The sections of road in the road network may be pre-defined, such as in the map data. In at least some examples, such sections may comprise portions of the road network which have similar features (e.g., a straight portion, a turning portion, and the like) and may further be segmented based on lane number, direction of travel, and the like. In such examples, a unique identification may be provided for each such segment.

In various examples, the vehicle computing system may determine one or more predicted trajectories associated with each detected object, such as from an initial position associated therewith. In some examples, the one or more predicted trajectories may be determined based on the sensor data. Each predicted trajectory may represent a potential path that the detected object may travel through the environment. In some examples, the one or more predicted trajectories may be determined based on an assumption that the vehicle will maintain a substantially constant velocity and/or direction of travel. In such examples, the one or more predicted trajectories may be based on an initial velocity and/or direction of travel determined based on the sensor data. In some examples, the one or more predicted trajectories may be based on a speed limit associated with determined location, a lawful direction of travel, location in a turning/non-turning lane, and/or criteria that may influence or control operation of the object in the environment. In some examples, the one or more predicted trajectories may be determined utilizing machine learning techniques, temporal logic, and/or tree searches such as those described in U.S. patent application Ser. No. 15/833,715 filed Dec. 6, 2017, entitled Trajectory Prediction of Third-Party Objects Using Temporal Logic and Tree Search, the entire contents of which are incorporated herein by reference. Additionally or in the alternative, the one or more predicted trajectories may be determined utilizing probabilistic heat maps to predict object behavior, such as those described in U.S. patent application Ser. No. 15/807,521 filed Nov. 8, 2017, entitled Probabilistic Heat Maps for Behavior Prediction, the entire contents of which are incorporated herein by reference.

In various examples, the vehicle computing system may generate a path polygon representing a two-dimensional path of the vehicle (e.g., vehicle path) through the environment. In some examples, the path polygon may represent a portion of a road network on which the vehicle plans to travel. In some examples, a width of the path polygon may be based on the road network corresponding to the vehicle path. For example, a path polygon on a divided highway may have a width substantially similar to a width of a portion of the divided highway on which the vehicle is traveling (e.g., width of the lanes traveling in a same direction). For another example, a path polygon on a non-divided highway may have a width corresponding the width of the entire road (e.g., lanes in both directions of travel). In various examples, the width of the path polygon may include a portion of a sidewalk and/or surfaces other than the road. In such examples, the vehicle computing system may be configured to determine relevance of objects located on segments other than the road (e.g., pedestrians on a sidewalk, vehicles exiting parking lots, etc.).

In various examples, a determination that an object is relevant to the vehicle may be based on a potential for the object to intersect the path polygon of the vehicle within a period of time (e.g., time period) in the future (e.g., 4 seconds, 8 seconds, 10 seconds, 1 minute, etc.). In at least one example, the pre-determined period of time may be 8 seconds. In some examples, the vehicle computing system may determine, based on the trajectory associated with the object, whether the object may intersect the path polygon. Based on a determination of a potential intersection within the time period, the vehicle computing system may determine that the object is relevant to the vehicle. Conversely, based on a determination that no potential trajectories associated with the object intersect the path polygon of the vehicle, the vehicle computing system may determine that the object is irrelevant to the vehicle.

In various examples, a determination that an object is relevant to the vehicle may be based on a determination that the object and the vehicle share or may share a portion of the road network (e.g., a road segment, an intersection, a traffic lane, etc.) within the time period. In some examples, the vehicle computing system may determine, based on the trajectories associated with the object, that the object may occupy one or more road segments in common with the vehicle while operating in the environment. Based on a determination that the vehicle and the object share at least one road segment in common (and/or are operating within a set of segments—e.g., neighboring lanes), the vehicle computing system may determine that the object is relevant to the vehicle. For example, a vehicle and an object may be approaching an intersection. Based on a determination that the object and the vehicle may both occupy at least a portion of the intersection over a time period, the vehicle computing system may determine that the object is relevant to the vehicle.

Additionally or in the alternative, a determination that an object is relevant to the vehicle may be based on a height associated with the object relative to the vehicle. As used herein, the term "height" of the object refers to a difference in elevation between the object and the vehicle. The height associated with the object may be indicative of an object location on a different road and/or road segment, such as an overpass, underpass, bridge, or the like. In various examples, the vehicle computing system may determine the height associated with a detected object based on sensor data. The height may represent a vertical distance of an object relative to the vehicle. For example, an object operating on an overpass (or otherwise above the vehicle) may have a positive (+) height associated therewith. For another example, an object operating on an underpass (or otherwise below the vehicle) may have a negative (−) height associated therewith. In some examples, the vehicle computing system may determine that an object with a corresponding height equal to or greater than a threshold height (e.g., +10 feet, +15 feet, +4 meters, −8 meters, −18 feet, etc.) is irrelevant to the vehicle. An absolute value of a threshold height corresponding to an object above the vehicle (positive height) may be the same or a different from an absolute value of a threshold height corresponding to an object below the vehicle (negative height). In various examples, based on a determination that the object height is equal to or greater than the threshold height (e.g., absolute value thereof), the vehicle computing system may determine that the object is on a different road segment from the vehicle (e.g., does not share a road segment with the vehicle) and/or does not intersect the path polygon of the vehicle. Based on the determination that the object does not share a road segment with the vehicle and/or does not intersect the path polygon of the vehicle, the vehicle computing system may determine that the object is irrelevant to the vehicle. In some examples, the vehicle computing system may determine that an object with a corresponding height equal to or below a threshold height may be relevant to the vehicle.

Based on a determination that an object is relevant, the vehicle computing system may continue to include data associated with the object in vehicle control planning considerations (e.g., vehicle control planning operations). The vehicle control planning considerations may include determining actions for a vehicle to take through the environment. The actions may be based on one or more dynamic considerations occurring in the environment. In various examples, the vehicle computing system may perform relevance determinations at random times (e.g., after traveling on a route for 5 seconds, 23 seconds, 93 seconds, etc.) or periodic intervals (e.g., every 0.1 seconds, 2 seconds, 8 seconds, 16 seconds, etc.) while operating in the environment. In such examples, the relevance determinations may be performed at pre-determined intervals throughout the vehicle operation. In at least one examples, the relevance determination may be performed at a frequency of 10 Hertz. In some examples, the vehicle computing system may be configured to dynamically determine to perform a relevance determination. In some examples, the dynamic determination may be based on a number of objects in the environment, a type (e.g., classification) of objects in the environment, a zone in which the vehicle operates (e.g., school zone, near a playground, near a venue, on a highway, etc.), or the like.

Based on a determination that an object is irrelevant, the vehicle computing system may omit data associated with the object from vehicle control planning considerations (e.g., disregard the object in subsequent control decisions, control the vehicle at the exclusion of the object). In various examples, the omission of data corresponding to the irrelevant object may make available computing resources to the vehicle computing system to perform additional in-depth estimation calculations regarding relevant objects. In such examples, by excluding data associated with the irrelevant objects, the vehicle computing system may increase a level of safety associated with vehicle operations. In various examples, the vehicle computing system may continue to include data associated with an object that was previously determined to be relevant (formerly relevant object) in vehicle control planning considerations for a period of time (e.g., 5 seconds, 8 seconds, 10 seconds, etc.) after a determination that the formerly relevant object is irrelevant. For example, at a first time, the vehicle computing system may determine that an object shares a road segment with the vehicle at substantially the same height (e.g., within a threshold height, such as within 5 feet, 9 feet, etc.) as the vehicle and is, therefore, relevant to the vehicle. At a second time, the vehicle computing system may determine that the object no longer shares a road segment with the vehicle nor does a trajectory associated therewith intersect the path polygon. Accordingly, the vehicle computing system may determine that the object is irrelevant to the vehicle at the second time. Based on the prior determination that the object was relevant at the first time, the vehicle computing system may continue to include data associated with the object in vehicle planning considerations for a period of time. At a third time, the vehicle computing system may determine that the period of time associated with consideration of formerly relevant objects has passed and the vehicle computing system may omit data associated with the object from vehicle control planning considerations.

The techniques discussed herein may improve a functioning of a vehicle computing system. Traditionally, in control planning for an autonomous vehicle, a vehicle computing system may consider each detected dynamic object in an environment. The vehicle computing system may consider each detected dynamic object in control planning considerations while the vehicle operates in the environment. However, including each detected object in planning considerations (e.g., trajectory determinations, calculations, etc.) can be extremely computationally expensive, particularly when there are numerous objects in an environment which are unlikely to interfere with or otherwise influence operation of the vehicle. By determining whether the detected objects are relevant to the vehicle, the techniques described herein may reduce a computational load to simulate predicted trajectories of objects in the environment, thereby improving the functioning of the vehicle computing system. In various examples, reducing the computational load of the vehicle computing system may provide an increased amount of processing power and/or memory to perform additional, more detailed estimations of relevant entities. The additional, detailed estimations of relevant entities may enable the vehicle computing system to enhance the safety of vehicle operation in the environment.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system using machine vision (e.g., in a system using image data).

FIG. 1 is an illustration of an autonomous vehicle 102 (vehicle 102) in an environment 100, in which an object relevance system may determine whether objects 104 in the environment may be relevant to the vehicle 102. A vehicle computing system may include the object relevance system of the vehicle 102. While described as a separate system, in some examples, the object relevance determination techniques described herein may be implemented by other vehicle systems, components, and/or computing devices. For example, and as will be described in further detail with regard to FIG. 6, the object relevance determination techniques described herein may be implemented at least partially by or in associated with a planning component of a vehicle, such as planning component 624.

In various examples, the vehicle computing device may be configured to detect dynamic objects 104(1), 104(2), 104(3), 104(4), 104(5), 104(6), and 104(7) (collectively, "object(s) 104") in the environment 100, such as via a perception system. The vehicle computing system may detect the object(s) 104 based on sensor data received from one or more sensors. In some examples, the sensor(s) may include sensors mounted on the vehicle 102, such as, for examples, cameras, motion detectors, lidar sensors, radar sensors, time of flight sensors, etc. In some examples, the sensor(s) may include one or more remote sensors, such as, for example, sensors mounted on another autonomous vehicle and/or one or more sensors 106 mounted in the environment 100.

In various examples, vehicle 102 may be configured to transmit and/or receive data from other autonomous vehicles, remote computing resources (e.g., teleoperations computing devices), and/or the sensor(s) 106. The data may include sensor data, such data regarding object(s) 104 detected in the environment 100. In various examples, the environment 100 may include the sensor(s) 106 for traffic monitoring, collision avoidance, or the like. In some examples, the sensor(s) 106 may be mounted in the environment to provide additional visibility in an area of reduced visibility, such as, for example, in a blind or semi-blind intersection. For example, an intersection in the environment 100 may be determined to have a blind intersection, where an approaching vehicle 102 may not be able to perceive objects 104 and/or other vehicles approaching from the left or right on the intersecting road. The intersection in the environment may thus include sensor(s) 106 to provide sensor data to an approaching vehicle 102 regarding an object 104, such as object 104(7), located on the intersecting road.

In various examples, the vehicle computing system may receive the sensor data and may determine one or more predicted object trajectories 108 based on the sensor data, such as trajectories 108(1), 108(2), 108(3A), 108(3B), 108(3c), 108(4), 108(5), 108(6) and 108(7) associated with objects 104(1), 104(2), 104(3), 104(4), 104(5), 104(6), and 104(7), respectively. In some examples, the trajectories 108 may include any number of potential paths in which the object 104 may travel from a current position (e.g., at the time of perception) and/or based on a direction of travel. For example, the vehicle computing system may determine that object 104(3) may continue straight through a junction 110, represented by trajectory 108(3A), turn left, represented by trajectory 108(3B), or execute a lane change to the right, represented by trajectory 108(3c). In some examples, the number of trajectories 108 may vary depending on a variety of factors, such as a classification of the object (e.g., type of object, such as car, semi-trailer truck, pedestrian, bicyclist, etc.), rules of the road, driving etiquette, a location in a turning/non-turning lane, proximity to an intersection, other stationary and/or dynamic objects, drivable surfaces, etc.

In various examples, a trajectory 108 may represent a distance a respective object may travel during a time period (e.g., 5 seconds, 8 seconds, 10 seconds, 30 seconds) associated with a relevance determination. In some examples, the time period may include a predetermined amount of time. In at least one example, the time period may be ten (10) seconds. In other examples, the time period may be variable based on one or more conditions (e.g., speed of the vehicle, number of objects in the environment, type of road, time of day, processing load on the vehicle computing system, etc.).

In various examples, the trajectories 108 may be determined assuming a constant velocity and/or direction of travel of the object 104. In some examples, the vehicle computing system may determine an initial location, direction of travel, and velocity of the object 104 and determine the trajectory 108 based on the object 104 maintaining the velocity and direction of travel throughout the period of time. In some examples, the constant velocity may be based on a known speed limit in the environment. In various examples, the trajectories 108 may include varied velocities, accelerations, and/or decelerations of the object 104. In such examples, the varied velocities may be based on a pre-defined estimated velocity for a maneuver, such as, for example, slowing 10 mph less than the speed limit for a turn and accelerating back to the speed limit. For example, trajectory 108(3B) may represent object 104(3) slowing a forward velocity on a first road before turning left onto a second road.

In various examples, the trajectories 108 may be determined utilizing one or more machine learning algorithms. In such examples, the vehicle computing system, such as via a prediction system, may receive the sensor data associated with the object 104 and predict a behavior of the object 104 based on the sensor data. For example, the vehicle computing system may be trained on captured image data of object 104 motion over time such that the vehicle computing system may recognize behavior that may suggest future actions (e.g., trajectories 108) the object 104 may take. In some examples, the vehicle computing system may determine predicted trajectories based on a top-down representation of an environment, such as by utilizing the techniques described in U.S. patent application Ser. No. 16/151,607 filed Oct. 4, 2018 and entitled "Trajectory Prediction on Top-Down Scenes," the entire contents of which are incorporated herein by reference. Additionally, or in the alternative, the vehicle computing system may utilize heat maps, tree search methods, and/or temporal logic formulas, such as those described in the U.S. Patent Application entitled "Probabilistic Heat Maps for Behavior Prediction" incorporated by reference above, to determine one or more trajectories 108 of the objects 104.

In various examples, the vehicle computing system may generate a path polygon 112 associated with the vehicle 102. The path polygon 112 may be based on a path 114 (e.g., a route of travel) of the vehicle 102. The path 114 may represent a planned path for the vehicle to travel through the environment 100. In various examples, the path 114 may include one or more positions (e.g., map coordinates, latitude, longitude, etc.) associated with a planned route of travel. In the illustrative example, the path 114 depicts vehicle 102 turning right at junction 110, making a left lane change, and turning left at junction 116. Although illustrated in FIG. 1 as extending throughout the route of travel in the environment 100, the path polygon 112, in some examples, may represent predicted route travel of the vehicle 102 for a pre-determined amount of time (e.g., 8 seconds, 30 seconds, 1 minute, etc.). In various examples, a length of the path polygon 112 may be determined based on one or more velocities associated with the vehicle over a pre-determined amount of time. In such examples, the path polygon 112 may represent a distance the vehicle may travel over the pre-determined amount of time. In some examples, the length of the path polygon 112 may include a minimum distance (e.g., 100 feet along the path 114, 100 meters along the path 114). In various examples, the path polygon 112 may extend a distance behind the vehicle 102. In such examples, the vehicle computing system may be configured to consider objects 104 located behind the vehicle 102 that may intersect the path polygon 112, such as to enhance the safety of operation of the vehicle 102.

The path polygon 112 may represent a portion of a road network on which the vehicle 102 may operate autonomously, such as along the path 114. The road network may include one or more road segments 118, such as road segments 118(1), 118(2), 118(3) . . . 118(N), etc. The road segments 118 may be defined on a map associated with the environment 100, such as that provided by a map component. In various examples, the road segments 118 may be defined by a reference line that follows the movement of the road (e.g., curves, straight portions, etc.) and an offset therefrom. In some examples, each of the road segments 118(1), 118(2), 118(3), 118(4), 118(5), 118(6), 118(7), 118(8), . . . 118(N) may have associated therewith a unique identifier. In the illustrative example, the road segments 118 may include a drivable surface of a road for vehicles operating in a single direction, such as road segments 118(2) and 118(3), in both directions, such as road segments 118(1) and 118(7). In various examples, junctions 110 and 116 may include one or more road segments. In the illustrative example, junctions 110 and 116 each include four road segments, such as road segments 118(4), 118(5), 118(6), and 118(N), though this is merely for illustrative purposes and a greater or lesser number of road segments 118 per junction may be contemplated.

In various examples, the vehicle computing system may determine a width of the path polygon 112 based on the road segments 118. In some examples, the width of the path polygon 112 may be the width of a road segment 118, such that the path polygon spans the road segment 118. In some examples, the width of the path polygon 112 may include the offset on both sides of the reference line associated with a road segment 118. In some examples, the width and/or offset may of the path polygon 112 may be such that the path polygon 112 includes a bicycle lane adjacent to a vehicle lane and/or a portion of a sidewalk adjacent to a drivable surface of a road. In such examples, the vehicle computing system may be configured to determine relevance of objects 104, such as bicycles, pedestrians, or the like, operating off a drivable surface of the road, but within a threshold distance of the vehicle such as to potentially influence the safe operation of the vehicle 102. In various examples, the polygon may extend at least partially in a direction opposite a direction of travel of the vehicle 102 (e.g., so as to capture some of the drivable surface behind the vehicle 102). In some examples, the path polygon 112 may include at least a portion of one or more road segments 118. In the illustrative example, the path polygon 112 includes a portion of each of the road segments 118(4), 118(5), 118(6), and 118(7) of junction 116.

In various examples, the width of the path polygon 112 may be based on one or more characteristics of a road corresponding to a road segment 118. The characteristic(s) may include whether a barrier, such as barrier 120, exists on either side of the drivable surface (e.g., median, on right side of road, etc.), turns in the road (e.g., curves in the road, etc.), lack of turns in the road (e.g., substantially straight road), proximity to crosswalks, speed limit, presence of sidewalks adjacent to drivable surface, distance to a sidewalk from a road segment, or the like. In some examples, the width of a path polygon 112 may be based on a maneuver (e.g., planned action, turn, lane change, etc.) associated with the path 114 and/or vehicle operation.

In various examples, the width of the path polygon 112 may be pre-determined based planned maneuvers of the vehicle 102, and/or one or more of the road segments 118 on which the vehicle 102 travels, such as road segments 118(1), 118(2), 118(4), 118(5), 118(6), and 118(7). In some examples, the path polygon 112 may have a fixed width (e.g., 45 feet, 60 feet, width of three standard lanes, width of four standard lanes, etc.) throughout the path 114. In some examples, the fixed width may be based on a largest (e.g., widest) width determined for the vehicle 102 along the length of the path 114, such as that determined based on characteristic(s). In some examples, the fixed width may be based on the path polygon 112 extending a fixed distance from a centerline of the vehicle 102 (e.g., 15 feet on either side of the centerline, 30 feet on either side of centerline, etc.).

In some examples, the path polygon 112 may have a variable width. In such examples, the variable width may be determined based on one or more planned maneuvers of the vehicle 102 and/or the one or more characteristics of the associated road segments 118. In the illustrative example, the path polygon 112 associated with the vehicle 102 has a first width $w_1$, a second width $w_2$, and a third width $w_3$. The first width $w_1$ may include at least a portion of a sidewalk adjacent to the road segment 118(1), two lanes associated with a direction of travel of the vehicle 102, and one lane in an opposite direction to the vehicle 102. The second width $w_2$ may include a portion of the sidewalk adjacent to the road segment 118(2) and two lanes associated with the direction of travel of the vehicle 102. In the illustrative example, the second width $w_2$ may be less than the first width based at least in part on the barrier 120 being located in a median between road segment 118(2) and 118(3). The third width $w_3$ may include a portion of a sidewalk adjacent to the road segment 118(7), two lanes associated with the direction of travel of the vehicle 102, and two lanes associated with the opposite direction of travel, such as to verify proper driving (e.g., compliance with traffic laws, rules of the road, etc.) of oncoming traffic. In such an example, the vehicle computing system may determine to include both lanes of opposite direction traffic based at least in part on the path 114 being in a left most lane of the road segment 118(7).

In various examples, the vehicle computing system may determine whether a detected object 104 is relevant to the vehicle 102 based on a trajectory 108 intersecting the path polygon 112. In some examples, the determination that the detected object 104 is relevant may be based on the trajectory 108 intersecting the path polygon 112 within the time period. An intersection of the trajectory 108 and the path polygon 112 may represent an estimated position of the respective object 104 traveling along trajectory 108 being within the path polygon 112 during the time period. Based on a determination of the trajectory 108 intersecting the path polygon 112 and/or the estimated position of the object 104 being within the path polygon 112, the vehicle computing system may determine that the respective object 104 is relevant to the vehicle 102. For example, the object 104(5) has an associated trajectory 108(5) that is predicted to intersect the path polygon 112. Based on the intersection with the path polygon 112, the vehicle computing system makes relevance determination 122(1), determining that the object 104(5) is relevant to the vehicle. For another example, the object 104(2) located behind the vehicle 102 has an associated trajectory 108(2) turning away from the path polygon 112. Because the object 104(2) is turning away and will not intersect the path polygon 112 during the time period, the vehicle computing system may make irrelevance determination 124(1), determining that the object 104(2) is irrelevant to the vehicle 102.

In various examples, the vehicle computing system may determine whether a detected object 104 is relevant to the vehicle 102 based on the detected object 104 sharing a road segment 118 with the vehicle 102. In some examples, a determination that the detected object 104 is relevant to the vehicle 102 may be based on the object 104 and the vehicle 102 sharing a road segment 118 within the time period (e.g., occupy a same road segment during the time period). In various examples, the vehicle computing system may be configured to determine a road segment 118(1) corresponding to a current location of the vehicle 102. In some examples, the vehicle computing system may be configured to determine one or more road segments 118(1) corresponding to predicted locations of the object 104, such as based on the associated trajectory 108 and predicted travel over the time period.

In various examples, the vehicle computing system may be configured to determine a current location of the detected object 104. In various examples, the current location of the detected object 104 may be based on a location relative to the vehicle 102. In some examples, the current location may include associated coordinates, such as those provided from one or more sensors 106, or one or more sensors located on another vehicle. In various examples, the vehicle computing system may identify a road segment 118 corresponding to the determined location of the detected object 104. In some examples, the vehicle computing system may utilize the map to identify the road segment. In some examples, the vehicle computing system may compare a location of the vehicle 102 to the location of the detected object 104 to determine the road segment 118 associated with the detected object 104.

In various examples, the vehicle computing system may determine a road segment 118 associated with the current position of the detected object 104 and one or more additional road segments 118 based on the trajectory 108 associated with the object 104. For example, the trajectory 108(3B) of object 104(3) may have a current position associated with a road and may traverse two or more road segments 118 in the junction 110. In various examples, the vehicle computing system may determine that a vehicle 102 and an object 104 share a road segment 118 (or neighboring road segments) based on a determination that the vehicle 102 and the object 104 share any road segments 118 associated with a junction 110, 116, etc. For example, the vehicle traveling along path 114 may traverse road segments 118(4), 118(5) and 118(6) of junction 116. Based on a determination that an object 104 may have a location corresponding to road segment 118(N) (not illustrated), the vehicle computing system may determine that vehicle 102 and the object 104 share a road segment 118.

Based on a determination that the vehicle 102 and the detected object 104 will not share a road segment over the time period, the vehicle computing system may determine that the detected object 104 is irrelevant to the vehicle. Based on a determination that the vehicle 102 and the detected object 104 will share a road segment over the period of time, the vehicle computing system may determine that the detected object 104 is relevant to the vehicle. For example, the vehicle computing system may determine that object 104(1), located a distance behind the vehicle 102, shares route segment 118(1) with the vehicle 102. Based on the shared the route segment 118(1) between the object 104(1) and the vehicle 102, the vehicle computing system may determine that object 104(1) is relevant to the vehicle in relevance determination 122(2). For another example, the vehicle computing system may determine that, during the time period, object 104(7) will remain operating on route segment 118(3). Due to the barrier 120, the vehicle computing system may determine that the vehicle 102 will not operate on route segment 118(3). Based on a determination that the object 104(7) and the vehicle 102 will not share a route segment 118, the vehicle computing system may determine that the object 104(7) is irrelevant to the vehicle 102 in irrelevance determination 124(2).

In various examples, a determination that the vehicle 102 and the object 104 may occupy a same road segment 118 may be based on a trajectory 108 of the object and/or the planned path 114 of the vehicle. In such examples, based on a determination that a possible route of travel of the object 104 may correspond to a route segment 118 associated with the path 114 of the vehicle over the time period, the vehicle computing system may determine that the object 104 is relevant to the vehicle. For example, the vehicle computing system may determine that object 104(3) has associated therewith three potential trajectories 108(3A), 108(3B), and 108(3c). Based on a determination that potential trajectory 108(3B) may cause the object 104(3) to share a road segment 118(8) with the vehicle 102, the vehicle computing system may determine that the object 104(3) is relevant to the vehicle 102, such as in relevance determination 122(3). For another example, the vehicle computing system may determine that the object 104(6) has an associated trajectory 108(6) that will not cause the object 104(6) to share a road segment 118 with the vehicle 102. Accordingly, the vehicle computing system may determine that the object 104(6) is irrelevant to the vehicle, such as in irrelevance determination 124(3).

In various examples, the vehicle computing system may first determine whether the vehicle 102 and a detected object 104 share a road segment 118 and may subsequently determine whether a trajectory of the object 104 intersects the path polygon 112. In such examples, the operations of determining a sharing of the road segment and determining the trajectory/path polygon 112 intersection may be ordered based on a computational expense associated therewith. For example, determining whether the vehicle and the detected object 104 share a road segment may be less computationally expensive than determining whether the trajectory 108 associated with the object 104 intersects the path polygon 112. Accordingly, the vehicle computing system may determine whether the vehicle 102 and the object 104 share a road segment 118 prior to determining whether the trajectory of the object 104 intersects the path polygon 112. In some examples the vehicle computing system may perform the operations substantially simultaneously.

In various examples, based on a determination that a vehicle 102 and a detected object 104 will not share a road segment and/or that a trajectory 108 associated with the object 104 does not intersect a path polygon 112 associated with the vehicle 102, the vehicle computing system may determine that an object 104 is irrelevant to the vehicle 102. For example, the object 104(4) is located ahead of the vehicle 102 on a road and has an associated trajectory 108(4) in a same direction as the vehicle 102. At least because the path 114 planned for the vehicle 102 involves a right turn at the junction 110, the vehicle computing system may determine that the vehicle 102 and the object 104(4) will not share a road segment. Additionally, because the object 104(4) is located in front of the vehicle 102 (and the path polygon 112) and traveling in the same direction as the vehicle 102, the vehicle computing system may determine that the trajectory 108(4) of the object 104(4) will not intersect the path polygon 112. Based the determination that the vehicle 102 and the object 104(4) will not share a road segment 118 and that the trajectory 108(4) associated with the object 104(4) will not intersect the path polygon 112, the vehicle computing system may determine that the object 104(4) is irrelevant to the vehicle, such as in irrelevance determination 124(4).

Based on a determination that an object 104 is irrelevant to the vehicle 102, such as irrelevance determinations 124 (1), 124(2), 124(3), and 124(4), the vehicle computing system may omit or exclude data associated with respective objects 104 from vehicle control planning considerations (e.g., vehicle control planning operations, control the vehicle at the exclusion of the object, etc.). In various examples, based on a determination that an object 104 is relevant to the vehicle 102, such as relevance determinations 122(1), 122 (2), and 122(3), the vehicle computing system may consider data associated with respective objects 104(5), 104(1), and 104(3) in vehicle control planning considerations (e.g., control the vehicle at the inclusion of the object). In some examples, based on a determination that an object 104 is relevant to the vehicle 102, such as relevance determinations 122(1), 122(2), and 122(3), the vehicle computing system may verify the relevance of the respective objects 104(5), 104(1), and 104(3). In such examples, the vehicle computing system may verify the relevance based on heights associated with the respective objects 104(5), 104(1), and 104(3). As will be discussed in further detail below with respect to FIG. 3, based on a determination that a height difference associated with an object determined to be relevant, such as object 104(5), is equal to or less than a threshold height difference, the relevance determination 122(1) may be verified. Based on a determination that the height difference associated with the object 104 determined to be relevant, such as object 104(5) is equal to or greater than a threshold height difference, the vehicle computing system may determine that the object 104(5) is actually irrelevant to the vehicle 102. For example, a height difference associated with object 104(5) may be greater than a threshold height difference and indicative of the object 104(5) travelling on a bridge over the road on which the vehicle 102 operates.

Figure 2:
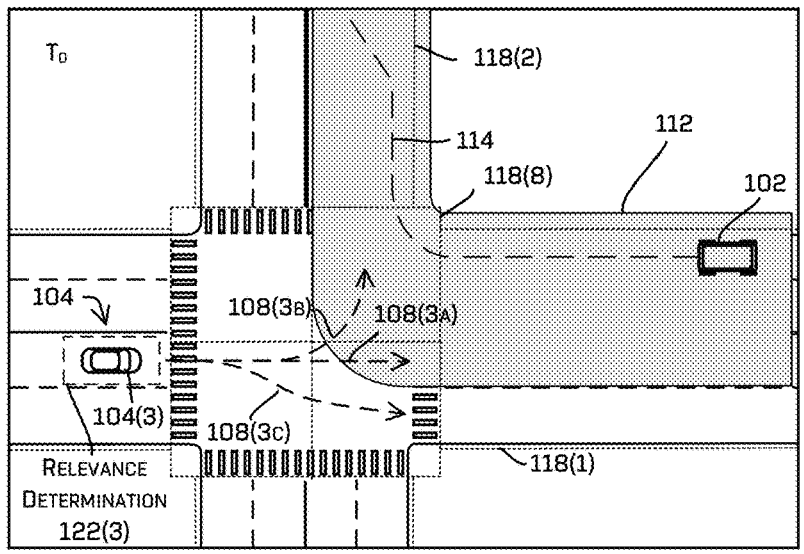
FIG. 2 depicts an example process for determining whether an object is relevant to a vehicle planning operation based on a previous determination of relevance.
Figure 2:
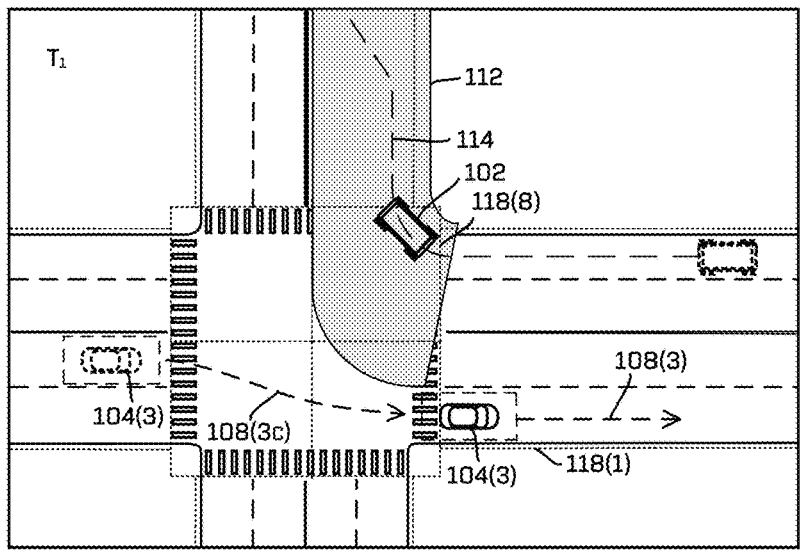
Figure 2:
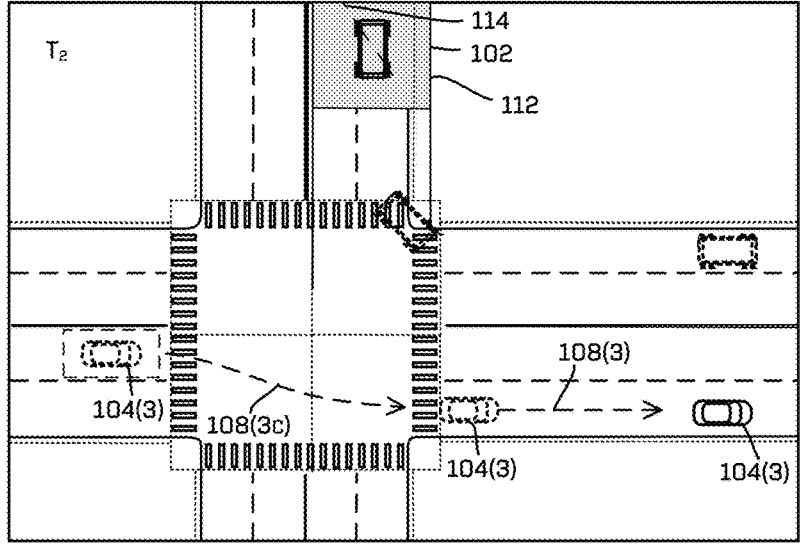

FIG. 2 depicts an example process 200 for determining relevance of an object 104(3) to a vehicle 102 based on a previous determination that the object 104(3) is relevant to the vehicle 102, such as relevance determination 122(3) of FIG. 1. Although illustrated with the example vehicle 102, object 104(3), trajectories 108(3A), 108(3B), and 108(3c), path 114, road segments 118(1), 118(2), and 118(8) of FIG. 1, the process 200 may be performed in other contemplated environments with different objects, trajectories, vehicle paths, etc. The process 200 may be performed with a vehicle computing system, such as that described above with regard to FIG. 1. Some or all of the process 200 may be performed by one or more components described below with regard to FIG. 6.

At operation 202, the vehicle computing system determine the object 104(3) is relevant to the vehicle 102 at a first time (To), such as in relevance determination 122(3). In various examples, the vehicle computing system may be configured to determine whether objects 104 are relevant to the vehicle at a pre-determined interval (e.g., every 0.1 second, every 0.5 seconds, etc.). In at least one example, the vehicle computing system may be configured to determine whether objects 104 are relevant to the vehicle 102 at a frequency of 10 Hertz. In various examples, the vehicle computing system may be configured to determine whether objects 104 are relevant to the vehicle dynamically, such as based on a number of objects 104 operating in an environment.

The relevance determination 122(3) may be based on a trajectory 108(3a), 108(3b), and/or 108(3c) associated with the object 104(3) intersecting a path polygon 112 of the vehicle and/or a determination that the object 104(3) may occupy a road segment 118(1), 118(2) and/or 118(8) associated with the path 114 of the vehicle. In various examples, the relevance determination 122(3) may additionally be based on a height associated with the object 104(3) being equal to or less than a threshold height. In such examples, the height difference associated with the object 104(3) being equal to or less than the threshold height may be indicative of the object 104(3) operating on a same plane as the vehicle 102 (e.g., at substantially the same height on a road).

In various examples, the vehicle computing system may determine whether a detected object 104(3) is relevant to the vehicle at random times during operation in the environment (e.g., after traveling on a route for 5 seconds, 23 seconds, 93 seconds, etc.). In some examples, the vehicle computing system may periodically determine whether detected objects, such as objects 104 are relevant to the vehicle (e.g., every 0.1 seconds, 2 seconds, 8 seconds, 16 seconds, etc.). In such examples, the vehicle computing system may determine relevance of detected objects at pre-determined intervals throughout the vehicle operation. In at least one example, the vehicle computing system may determine relevance of detected objects at a frequency of 10 Hertz. In some examples, the vehicle computing system may be configured to dynamically determine whether detected objects are relevant to the vehicle. In some examples, the dynamic determination may be based on one or more factors in the environment (e.g., a number of objects, a type (e.g., classification) of objects, a zone in which the vehicle operates (e.g., school zone, near a playground, etc.), or the like. In various examples, the vehicle computing system may be configured to assign an identifier to each object 104 and track the object based on the identifier. For example, based on detection of the object 104(3), the vehicle computing system may assign identifier "AA13" to the object 104(3) and associate the identifier therewith in subsequent relevance determinations and/or control planning considerations. As such, the vehicle computing system may be configured to quickly identify and track the object 104(3) as it moves through the environment.

In some examples, the frequency associated with the relevance determinations may be based at least in part on a frequency associated with a planning component, such as planning component 624. In various examples, the planning component may analyze sensor data to determine one or more actions to take while operating in the environment 100. The actions may be dynamically determined based on one or more of relevant objects, road characteristics (e.g., potholes, construction areas, etc.), one or more obstacles (e.g., non-moving entities in the environment), or the like. The actions may include maintaining a course and/or speed, changing lanes, navigating around an obstacle, or the like. In various examples, to ensure the continual safe operation of the vehicle 102, the planning component may determine the action(s) to take at the periodic interval. In various examples, the relevance determinations may be performed substantially simultaneously (e.g., within a threshold time) with the action determination(s), such as at the same frequency.

At operation 204, the vehicle computing system may determine that the object is irrelevant to the vehicle at a second time $T_1$. In some examples, the second time $T_1$ may be at a pre-determined interval of time from $T_0$. In such examples, the interval may be a periodic interval for determining relevance of detected agents. In some examples, the vehicle computing system may determine whether the object 104(3) is relevant to the vehicle 102 at the second time $T_1$ based on one or more factors in the environment (e.g., dynamically or randomly).

The vehicle computing system may determine that, at the second time $T_1$, the vehicle is located in road segment 118(8) and is transitioning into road segment 118(2). The vehicle computing system may also determine that the object 104(3) is located in road segment 118(1) and the trajectory 108(3) predicts continued movement of the object 104(3) along the road segment 118(1) in a direction away from the vehicle 102. Accordingly, the vehicle computing system may determine that the object 104(3) is not (and will not be over a time period) in the road segment 118(8) and/or 118(2) associated with a position of the vehicle 102. In other words, the vehicle computing system may determine that the object 104(3) and the vehicle 102 do not occupy a same road segment (share a road segment) at the second time $T_1$.

The vehicle computing system may also determine that, at the second time $T_1$, the trajectory 108(3) associated with the object 104(3) will not intersect the path polygon 112 of the vehicle 102 over the time period. The determination that the object 104(3) is irrelevant to the vehicle 102, at operation 204, may be based on a determination that the vehicle 102 and the object 104(3) do share a road segment (and/or will not share a road segment over a time period) and that the trajectory 108(3) associated with the object 104(3) will not intersect the path polygon 112 over the time period.

At operation 206, the vehicle computing system may determine to include data associated with the object 104(3) in vehicle control planning operations (e.g., control vehicle at the inclusion of the object). The determination to include data associated with the object 104(3) may be based on a determination that the object 104(3) was previously determined to be relevant to the vehicle 102. In various examples, the vehicle computing system may continue to consider a formerly relevant object, such as object 104(3) for a second period of time (e.g., 5 seconds, 7 seconds, 10 seconds, etc.) after a determination that the object 104(3) is irrelevant to the vehicle 102. By continuing to include data associated with the object 104(3), the vehicle computing system may mitigate errors in prediction and/or planning systems, such as by ensuring an action performed by the vehicle will not negatively impact the object 104(3), or the operation thereof. As such, the continued inclusion of the data may increase a level of safety associated with the operation of the vehicle 102.

At operation 208, the vehicle computing system may determine to disregard data associated with the object 104(3) at a third time $T_2$. In some examples, the determination to disregard the data associated with the object 104(3) may be based on a determination that the object 104(3) is irrelevant to the vehicle 102 at the third time $T_2$. In some examples, the determination to disregard the data associated with the object 104(3) may be based on a determination that the object 104(3) has been irrelevant to the vehicle 102 for the second period of time. In some examples, the vehicle computing system may determine that the third time $T_2$ is a time corresponding to a time that is equal to or greater than the second time $T_1$ plus the second period of time (e.g., the second period of time has passed). Based on a determination that the object 104(3) has been irrelevant to the vehicle 102 for at least the second period of time, the vehicle computing system may omit data associated therewith from control planning considerations (e.g., control the vehicle at the exclusion of the object).

Figure 3:
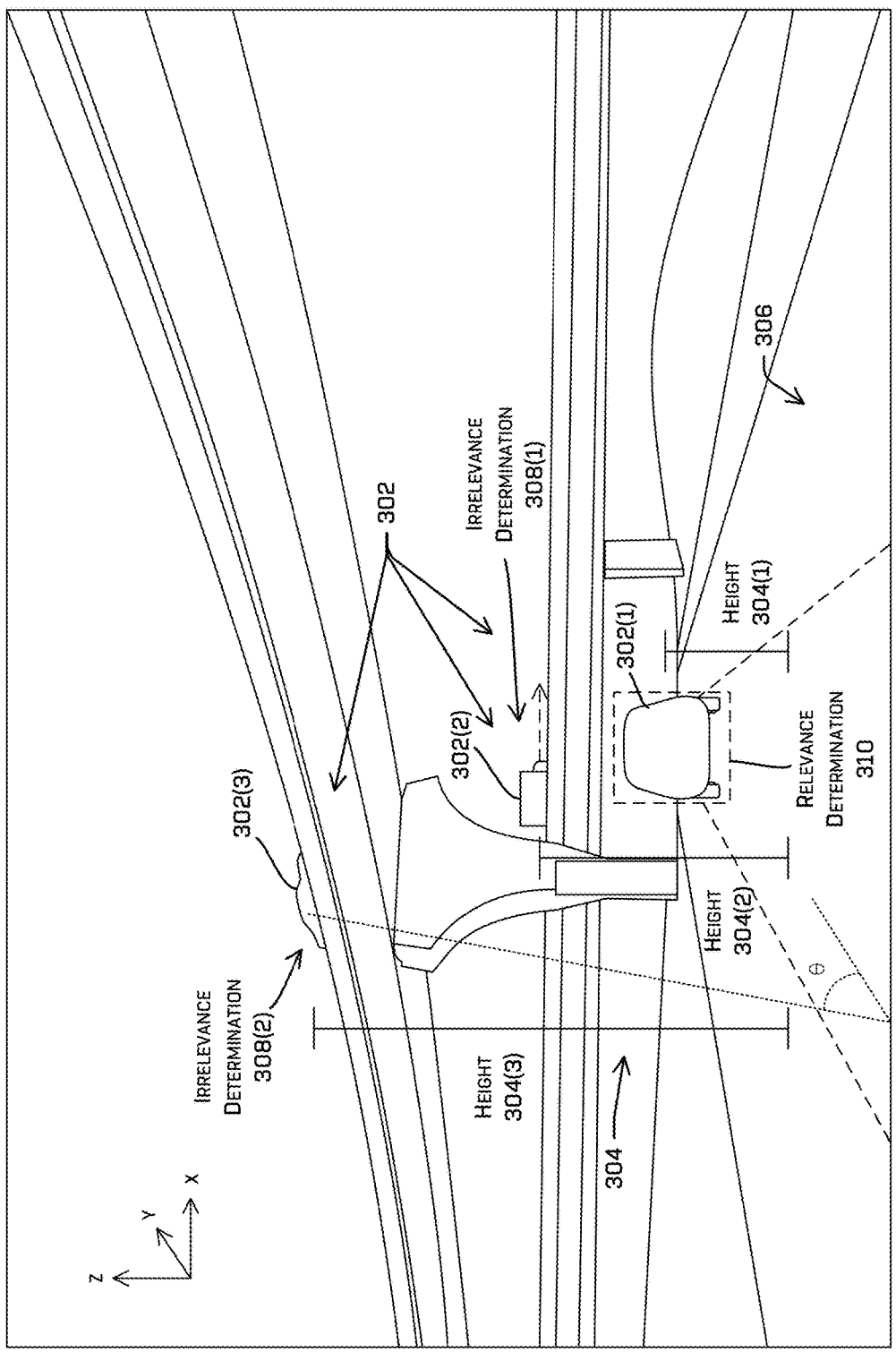
FIG. 3 is an illustration of an environment, in which an example object relevance system may determine whether objects in the environment are relevant to a vehicle planning operation based on a height associated with the objects relative to the vehicle.

FIG. 3 is an illustration of an environment 300, in which an example object relevance system may determine whether an object 302, such as objects 302(1), 302(2), and 302(3), is relevant to a vehicle based on a height 304 of the object 302 relative to the vehicle, such as height 304(1), 304(2), and 304(3). As discussed above, a vehicle computing system may receive sensor data from one or more sensors of the vehicle and/or one or more remote sensors.

In some examples, the vehicle computing system may be configured to determine a height 304 associated with a detected object 302 in the environment 300 based on the sensor data. In various examples, the height 304 may represent vertical distance of the object 302 from a surface of a road 306 on which the vehicle is operating. In some examples, the height 304 may represent a vertical distance of the object 302 above or below the vehicle or a point thereon (e.g., a sensor height on the vehicle). In various examples, the vehicle computing system may determine the height 304, such as height 304(3)

In various examples, the vehicle computing system may determine the height 304, such as height 304(3) based on a detected elevation angle (θ) associated with an object 302, such as object 302(3) and a detected distance to the object 302(3). In such examples, the vehicle computing system may be able to determine a height using a trigonometric function (e.g., sin θ). In various examples, a perception component associated with the vehicle 102, such as perception component 622 may be configured to determine the height 304, such as based on the angle (θ) and the distance to the object 302. In such examples, the perception component 622 may provide the height 304 to a relevance determination component, such as relevance determination component 630 of the vehicle computing system. Although illustrated in FIG. 3 as vertical distances above the vehicle, the vehicle computing system may be configured to determine vertical distances below the vehicle, such as in an example in which the vehicle operating on an overpass detects an object 302 on a road below. In such examples, the height may include a negative value, representative of the object being located below the vehicle.

In some examples, the vehicle computing system may determine, based on the angle (θ) that an object 302 associated therewith is operating on substantially the same plane or a different plane from the vehicle (e.g., a plane above or a plane below). In some examples, a determination that the object 302 is operating on the different plane may be based on the angle being equal to or greater than a first threshold angle (e.g., 30 degrees, 45 degrees, etc.). In some examples, a determination that the object 302 is operating on substantially the same plane as the vehicle may be based on the angle being equal to or less than a second threshold angle (e.g., 5 degrees, 10 degrees, etc.). For example, the object 302(1) operating directly in front of the vehicle on the road 306 may have an associated angle of 0 degrees. Based on a determination that the 0 degree angle is below a threshold angle, the vehicle computing system may determine that the object 302(1) is operating on substantially the same plane as the vehicle.

In various examples, the vehicle computing system may determine, based on the height 304, that the corresponding object 302 is operating on substantially the same or a different plane from the vehicle (e.g., different road segment, different altitude, etc.). In some examples, a determination that the object 302 is operating on the different plane may be based on the height 304 being equal to or greater than a threshold height. The threshold height may be a predetermined height indicative of a different plane, road segment, altitude, or the like. In various examples, the vehicle computing system may determine that an object 302 is operating on a plane above the vehicle based on a first threshold height (e.g., threshold height above the vehicle). In some examples, the vehicle computing system may determine that an object 302 is operating on a plane below the vehicle based on a second threshold height (e.g., threshold height below the vehicle). The first threshold height and the second threshold height may be the same or different values (e.g., absolute values) with opposite sign (e.g., positive/negative). For example, the vehicle computing system may determine that a height 304(1) associated with the object 302(1) is less than a threshold height. Based on the determination that the height 304(1) is less than the threshold height, the vehicle computing system may determine that the object 302(1) is operating on substantially a same plane as the vehicle. For another example, the vehicle computing system may determine that a height 304(2) associated with an object 302(2) is greater than a threshold height. Based on the determination that the height 304(2) is greater than the threshold height, the vehicle computing system may determine that the object 302(2) is operating on a different plane from the vehicle.

In various examples, the vehicle computing system may identify a position associated with an object 302 and access a map of the environment 300 to determine whether the object 302 is operating on the same or a different plane as the vehicle. The map may include one or more road segments at different heights. For example, the map may include a road, an overpass or bridge crossing over the road, and/or an underpass or bridge crossing under the road. In some examples, the vehicle computing system may determine a road segment associated with the object 302 based on the position and the height associated with the object 302 and the one or more road segments on the map. For example, the vehicle computing system may determine that object 302(2) is at a first position and a height 304(2). The vehicle computing system may identify two overpasses in proximity to the vehicle, such as the two overpasses depicted in FIG. 3. The vehicle computing system may determine that one of the overpasses has a height associated with it is substantially the same as the height 304(2) (e.g., within a threshold distance, such as 3 feet, 5 feet, 8 feet, etc.). Based on a determination that the position and height 304(2) of the object 302(2) correspond to the overpass and height associated therewith, the vehicle computing system may determine that the object 302(2) is operating on a different plane from the vehicle and is, therefore, irrelevant to the vehicle.

In various examples, based on a determination that an object 302 is operating on a different plane, such as objects 302(2) and 302(3), the vehicle computing system may determine that the objects 302(2) and 302(3) are irrelevant to the vehicle, such as in irrelevance determination 308(1) and 308(2). In some examples, based on a determination that an object 302 is operating on substantially the same plane as the vehicle, such as object 302(1), the vehicle computing system may determine that the object 302(1) is relevant to the vehicle, such as in relevance determination 310.

In some examples, the vehicle computing system may determine whether the object 302 and the vehicle share a road segment, such as described above with regard to FIG. 1, by limiting a relevance determination to objects operating at substantially the same height as the vehicle. In such examples, the vehicle computing system may receive data corresponding to objects 302, such as from a perception component, and may identify one or more objects operating at substantially the same height as the vehicle, such as object 302(1). The vehicle computing device may thus perform a relevance determination on object 302(1), excluding objects 302(2) and 302(3) from consideration.

In some examples, the determination of relevance/irrelevance based on height, as discussed herein, may be performed simultaneously with or after determining that an object 302 is relevant based on a shared road segment or object trajectory intersection with a path polygon, such as relevance determination 122(1), 122(2), and 122(3) of FIG. 1. In such examples, based on an initial determination of relevance due to a shared road segment and/or intersection with a path polygon, the vehicle computing system may verify that the object 302 is relevant to the vehicle based on a height associated therewith. In some examples, the determination of relevance/irrelevance based on height may be performed before determining that an object 302 is relevant based on a shared road segment or object trajectory intersection with a path polygon. In such examples, the vehicle computing system may determine that an object 302 is operating on substantially the same plane as the vehicle prior to determining relevance based on a shared road segment or intersection with a path polygon.

Figure 4:
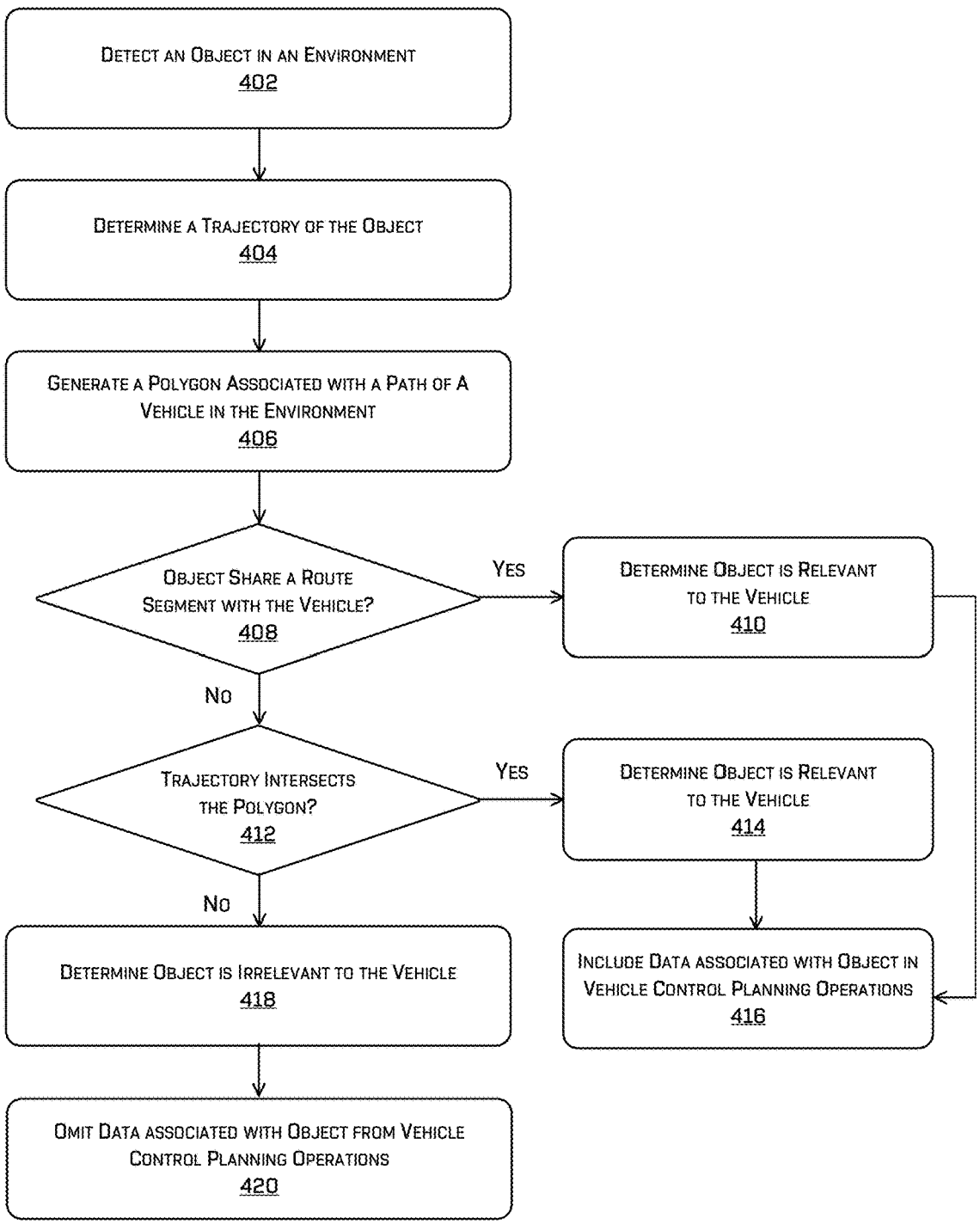
FIG. 4 depicts an example process for determining whether an object is relevant to a vehicle planning operation.
Figure 5:
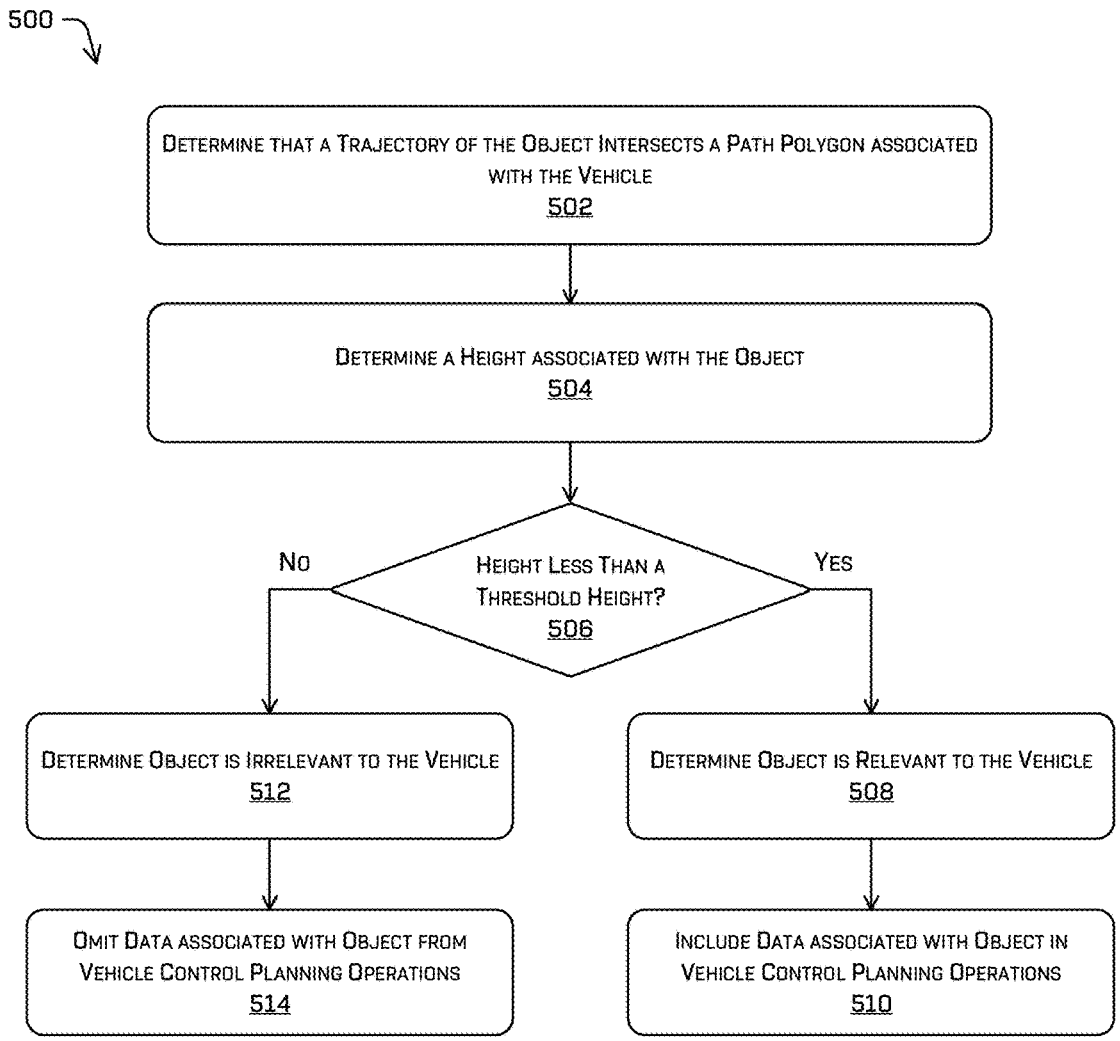
FIG. 5 depicts an example process for determining whether an object is relevant to a vehicle planning operation based on a height associated with the object relative to the vehicle.

FIGS. 4 and 5 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

FIG. 4 depicts an example process 400 for determining relevance of an object in an environment to a vehicle. Some or all of the process 400 may be performed by one or more components in FIG. 6, as described herein. For example, some or all of the process 400 may be performed by the vehicle computing device(s) 604.

At operation 402, the process may include detecting an object in an environment. A vehicle computing system may detect the object based on sensor data received from one or more sensors. In some examples, the sensor(s) may include sensors mounted on the vehicle, such as, for examples, cameras, motion detectors, lidar, radar, etc. In some examples, the sensor(s) may include one or more remote sensors, such as, for example sensors mounted on another autonomous vehicle, and/or sensors mounted in the environment. Such detections may be performed in accordance with, for example, the perception component detailed in FIG. 6.

At operation 404, the process may include determining a trajectory of the object. In some examples, the vehicle computing system may determine one or more trajectories of the object. The one or more trajectories may represent any number of potential paths in which the object may travel from a current position (e.g., at the time of perception) and/or based on a direction of travel. Additionally, the one or more trajectories may represent one or more velocities of the vehicle traveling on the potential path(s). In some examples, the number of trajectories may vary depending on a variety of factors, such as a classification of the object (e.g., type of object, such as car, semi-trailer truck, pedestrian, bicyclist, etc.), rules of the road, rules of good driving, a location in a turning/non-turning lane, proximity to an intersection, other stationary and/or dynamic objects, drivable surfaces, etc.

In various examples, a trajectory may represent a distance a respective object may travel during a time period (e.g., 8 seconds, 10 seconds, 30 seconds) associated with a relevance determination. In some example, the time period may include a predetermined amount of time. In at least one example, the time period may be eight (8) seconds. In various examples, the one or more trajectories may be determined assuming a constant velocity and/or direction of travel of the object. In some examples, the vehicle computing system may determine an initial location, direction of travel, and velocity of the object and determine a trajectory based on the object maintaining the velocity and direction of travel throughout the period of time. In some examples, the constant velocity may be based on a known speed limit in the environment. In various examples, the one or more trajectories may include varied velocities, accelerations, and/or decelerations of the object. In such examples, the varied velocities may be based on a pre-defined velocity for a maneuver, such as, for example, slowing 15 mph less than the speed limit for a turn and accelerating back to the speed limit. In various examples, the one or more trajectories may be determined utilizing one or more of machine learning techniques, temporal logic, tree searches, probabilistic heat maps, top-down prediction, and/or any other method for predicting behavior of an object in the environment.

At operation 406, the process may include generating a polygon associated with a path of a vehicle in the environment. The polygon may be based on a path (e.g., a route of travel) of the vehicle, such as that received from a planner component. The path may represent a planned path for the vehicle to travel through the environment. In various examples, the path may include one or more positions (e.g., map coordinates, latitude, longitude, etc.) associated with a planned route of travel. In some examples, the path polygon may represent predicted route travel of the vehicle for a pre-determined amount of time (e.g., 8 seconds, 30 seconds, 1 minute, etc.).

The path polygon may represent a portion of a road network on which the vehicle plans to travel operating along the path. The road network may include one or more road segments, such as those defined on a map associated with the environment. In various examples, the vehicle computing system may determine a width of the path polygon based in part on the road segments. In various examples, the width of the path polygon may be based on one or more characteristics of a road segment associated with the path. The characteristic(s) may include whether a barrier exists on either side of the drivable surface (e.g., median, on right side of road, etc.), turns in the road (e.g., curves in the road, etc.), lack of turns in the road (e.g., substantially straight road), proximity to crosswalks, speed limit, presence of sidewalks adjacent to drivable surface, or the like. In some examples, the width of a path polygon may be based on a maneuver (e.g., planned action, turn, lane change, etc.) associated with the path and/or vehicle operation. As discussed above, the path polygon may include a constant or variable width.

At operation 408, the process may include determining whether the object shares a route segment with the vehicle (and/or belongs to one or more neighboring segments along the path). In various examples, the vehicle computing system may determine an initial position of the object (e.g., position at detection, such as that described in operation 402). In such examples, the vehicle computing system may determine a road segment associated with the initial position of the object. In some examples, the vehicle computing system may determine one or more road segments associated with the trajectory of the object. In some examples, the vehicle computing system may compare the one or more road segments associated with the initial position of the object and/or the object trajectory to one or more road segments associated with the vehicle.

In various examples, the vehicle computing system may determine that the vehicle and the object share a route segment based on a determination that the vehicle and the object may both occupy a junction (e.g. intersection). In such examples, the vehicle computing system may identify a road segment associated with the vehicle and a road segment associated with the object as being road segments corresponding to a junction. Based on a determination that the object and the vehicle may both occupy a junction, the vehicle computing system may determine that the vehicle and the object share a road segment. In various examples, the vehicle computing system may be configured to determine whether the vehicle and the object share a road segment at a height corresponding to the vehicle. In such examples, the vehicle computing system determine the object is relevant in absence of an additional height verification, such as that described in process 500 of FIG. 5.

Based on a determination that the object shares the route segment with the vehicle ("Yes" at operation 408), the process may include, at operation 410, determining that the object is relevant to the vehicle.

Based on a determination that the trajectory does not share the route segment with the vehicle ("No" at operation 408), the process may include, at operation 412, determining whether the trajectory of the object intersects the polygon. An intersection of the trajectory and the polygon may represent an estimated position of the object traveling along trajectory entering the path polygon during the time period.

Based on a determination that the trajectory intersects the polygon of the vehicle ("Yes" at operation 412), the process may include, at operation 414, determining that the object is relevant to the vehicle. Responsive to a determination that the object is relevant, such as at operation 410 and operation 414, the process may include, at operation 416, including data associated with the object in vehicle control planning operations (e.g., controlling the vehicle at the inclusion of the object). Such planning may comprise, for example, simulations of one or more actions the vehicle and detected object may take over a period of time (which in some examples may correspond to the period of time associated with operation 408).

Based on a determination that the trajectory does not intersect the polygon of the vehicle ("No" at operation 412), the process may include, at operation 418, determining that the object is irrelevant to the vehicle.

At operation 420, the process may include omitting data associated with the object from vehicle control planning operations (e.g., controlling the vehicle at the exclusion of the object).

FIG. 5 depicts an example process 500 for determining relevance of an object in an environment to a vehicle based on a height associated with the object. Some or all of the process 500 may be performed by one or more components in FIG. 6, as described herein. For example, some or all of the process 500 may be performed by the vehicle computing device(s) 604.

At operation 502, the process may include determining that a trajectory associated with the object intersects a path polygon associated with the vehicle (e.g., a determination of "Yes" at operation 408 or operation 412 of FIG. 4).

In various examples, the vehicle computing system may generate a path polygon based on a path of the vehicle through the environment. The path polygon may represent a two-dimensional depiction of one or more road segments and/or portions thereof, that the vehicle plans to operate on based on the path. The vehicle computing system may determine one or more trajectories associated with the object. The one or more trajectories may represent potential paths the object may travel through the environment. In some examples, the trajectories may represent a route and distance of travel the object may travel through the environment for a time period (e.g., 4 seconds, 8 seconds, etc.). In various examples, the vehicle computing system may compare the trajectory to the path polygon to determine whether the object intersects the path polygon. An intersection of the trajectory and the path polygon may represent an estimated position of the object traveling along trajectory entering the path polygon during the time period.

At operation 504, the process may include determining a height associated with the object. In various examples, the vehicle computing system may determine the height associated with the object based on sensor data received from one or more sensors of the vehicle and/or one or more remote sensors. In some examples, the height associated with the object may represent a vertical distance of the object from a road surface on which the vehicle is operating. In some examples, the height associate with the object may represent a vertical distance of the object above or below the vehicle and/or a point thereon (e.g., a sensor height on the vehicle). In some examples, the vehicle computing system may determine the height based on a detected elevation angle associated with the object and/or a detected distance to the object. In various examples, the height may be determined by a perception component of the vehicle computing system, such as perception component 622.

At operation 506, the process may include determining whether the height is less than a threshold height. In some examples, the vehicle computing system may determine whether the height is less than or equal to a threshold height. In some examples, the threshold height may represent a height indicative of an object operating on substantially a same plane (e.g., same road, same altitude, etc.) as the vehicle. For example, if the height of the object is within 10 feet of the vehicle, the object may be determined to be operating on the same plane as the vehicle.

Based on a determination that the height is less than the threshold height ("Yes" at operation 506), at operating 508, the process may include determining that the object is relevant to the vehicle. Based on a determination that an object is relevant to the vehicle, the vehicle computing system may, at operation 510, include data associated with the object in vehicle control planning operations (e.g., control vehicle at the inclusion of the object).

Based on a determination that the height is greater than or equal to the threshold height ("No" at operation 506), at operating 512, the process may include determining that the object is irrelevant to the vehicle. In various examples, based on a determination that the height is greater than or equal to the threshold height, the vehicle computing system may access a map to determine whether additional road segments are present in the environment. In such examples, the map may depict road segments associated with overpasses, bridges, underpasses, etc. In various examples, the vehicle computing system may map the object to the additional road segments based on the height associated therewith to determine a road segment on which the object is operating. Based on a determination that the road segment on which the object is operating differs from the vehicle road segment, the vehicle computing system may determine that the object is irrelevant to the vehicle. Based on the determination that the object is not relevant to the vehicle, the vehicle computing system may, at operation 514, omit data associated with the object from vehicle control planning operations (e.g., control vehicle at the exclusion of the object).

Figure 6:
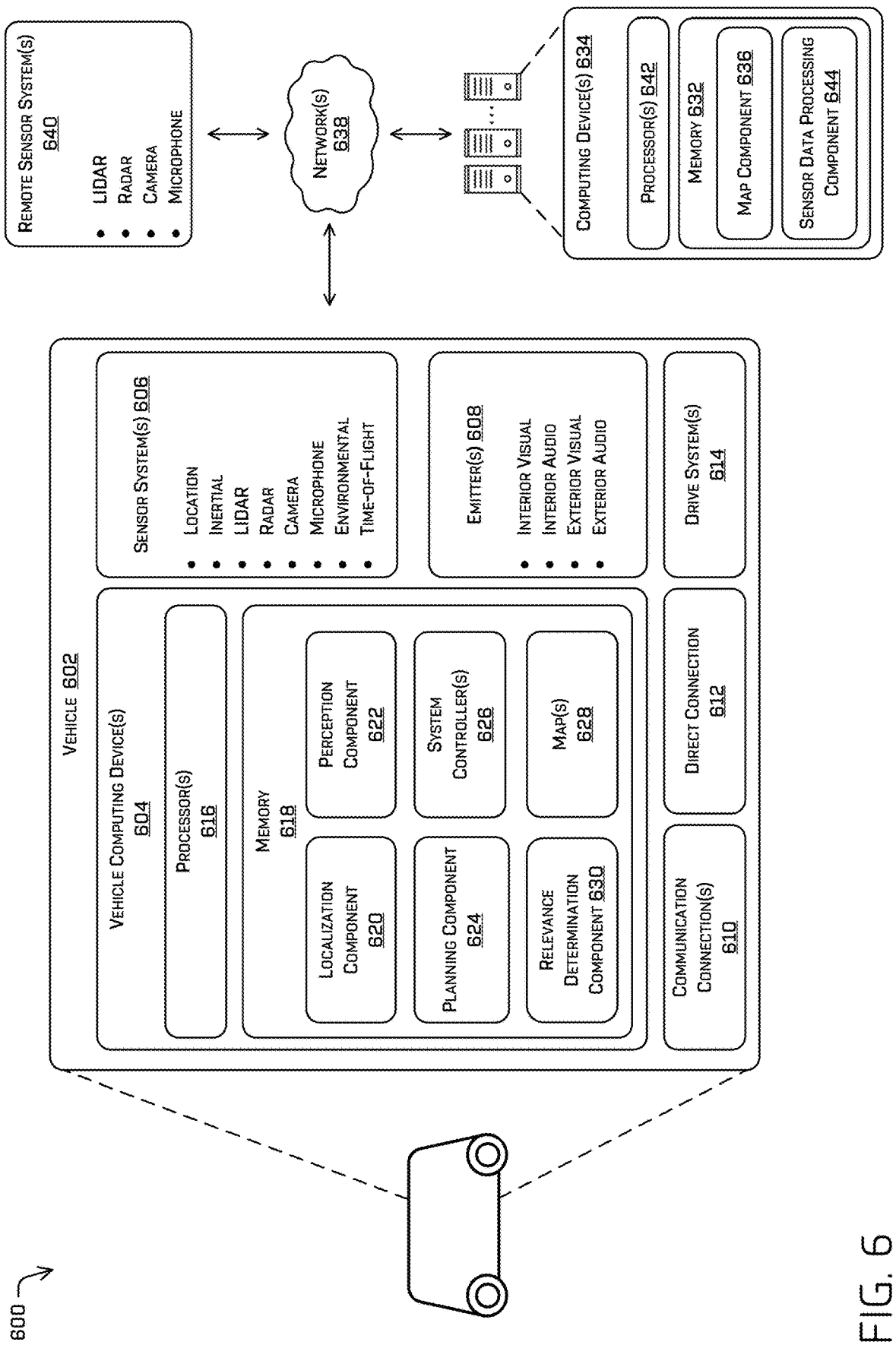
FIG. 6 is a block diagram of an example system for implementing the techniques described herein.

FIG. 6 is a block diagram of an example system 600 for implementing the techniques described herein. In at least one example, the system 600 may include a vehicle 602, such as vehicle 102.

The vehicle 602 may include one or more vehicle computing devices 604, one or more sensor systems 606, one or more emitters 608, one or more communication connections 610, at least one direct connection 612, and one or more drive systems 614.

The vehicle computing device(s) 604 may include one or more processors 616 and memory 618 communicatively coupled with the one or more processors 616. In the illustrated example, the vehicle 602 is an autonomous vehicle; however, the vehicle 602 could be any other type of vehicle, such as a semi-autonomous vehicle, or any other system having at least an image capture device (e.g., a camera enabled smartphone). In the illustrated example, the memory 618 of the vehicle computing device(s) 604 stores a localization component 620, a perception component 622, a planning component 624, one or more system controllers 626, one or more maps 628, and a relevance determination component 630. Though depicted in FIG. 6 as residing in the memory 618 for illustrative purposes, it is contemplated that the localization component 620, a perception component 622, a planning component 624, one or more system controllers 626, one or more maps 628, and a relevance determination component 630 may additionally, or alternatively, be accessible to the vehicle 602 (e.g., stored on, or otherwise accessible by, memory remote from the vehicle 602, such as, for example, on memory 632 of a remote computing device(s) 634). Additionally, although illustrated as a separate component, the relevance determination component 630 may be a part of and/or the functions thereof as described herein, may be performed by the planning component 624.

In at least one example, the localization component 620 may include functionality to receive data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment, such as from map(s) 628 and/or map component 636 and may continuously determine a location and/or orientation of the autonomous vehicle within the map. In various examples, the map(s) 628 may include road segments identifications (e.g., numbers, etc.) associated with various portions of the roads on the map(s). In some examples, the road segment identifications may be associated with a road network managed at least in part by the remote computing device(s) 634. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 620 may provide data to various components of the vehicle 602 to determine an initial position of an autonomous vehicle for determining whether an object is relevant to the vehicle 602, as discussed herein.

In some instances, the perception component 622 may include functionality to perform object detection, segmentation, and/or classification. In some examples, the perception component 622 may provide processed sensor data that indicates a presence of an object (e.g., entity) that is proximate to the vehicle 602 and/or a classification of the object as an object type (e.g., car, pedestrian, cyclist, animal, building, tree, road surface, curb, sidewalk, unknown, etc.). In some examples, the perception component 622 may provide processed sensor data that indicates a presence of a stationary entity that is proximate to the vehicle 602 and/or a classification of the stationary entity as a type (e.g., building, tree, road surface, curb, sidewalk, unknown, etc.). In additional or alternative examples, the perception component 622 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position, e.g., height), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a zone associated with the environment (e.g., school zone, business district, etc.), a time of day, a day of a week, a season, a weather condition, an indication of darkness/light, etc.

In general, the planning component 624 may determine a path, such as path 114, for the vehicle 602 to follow to traverse through an environment. For example, the planning component 624 may determine various routes and trajectories and various levels of detail. For example, the planning component 624 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 624 may generate an instruction for guiding the autonomous vehicle 602 along at least a portion of the route from the first location to the second location. In at least one example, the planning component 624 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 602 to navigate.

In various examples, the planning component 624 may be configured to generate a path polygon, such as path polygon 112 for the vehicle 602. The path polygon may be based on the path of the vehicle 602. The path polygon may represent a portion of a road network on which the vehicle 602 plans to travel operating along the path. The road network may include one or more road segments, such as road segments 118. The road segments may be defined by the map(s) corresponding to the operating environment. In various examples, the planning component 624 may determine a width of the path polygon based on the road segments. In various examples, the width of the path polygon may be based on one or more characteristics of the road segment. The characteristic(s) may include whether a barrier exists on either side of the drivable surface (e.g., median, on right side of road, etc.), turns in the road (e.g., curves in the road, etc.), lack of turns in the road (e.g., substantially straight road), proximity to crosswalks, speed limit, presence of sidewalks adjacent to drivable surface, or the like. In some examples, the width of a path polygon may be based on a maneuver (e.g., planned action, turn, lane change, etc.) associated with the path and/or vehicle operation.

In various examples, the width of the path polygon may be pre-determined based planned maneuvers of the vehicle 602, and/or one or more of the road segments on which the vehicle 602 plans to travel. In some examples, the path polygon may have a fixed width (e.g., 45 feet, 60 feet, width of three standard lanes, width of four standard lanes, etc.) throughout the path. In some examples, the fixed width may be based on a largest (e.g., widest) width determined for the path polygon along the length of the path, such as that determined based on consideration(s). In some examples, the fixed width may be based on the path polygon extending a fixed distance from a centerline of the vehicle 602 (e.g., 15 feet on either side of the centerline, 30 feet on either side of centerline, etc.).

In some examples, the path polygon may have a variable width. In such examples, the various widths of the path polygon may be determined based on the characteristic(s) associated with the road segment and/or planned maneuvers of the vehicle 602. For example, a path polygon may have a first width of 25 feet encompassing two lanes and a portion of a sidewalk adjacent to a first road on which the vehicle operates. The planning component 624 may determine that the vehicle 602 is going to turn left at a junction and may increase the width of the path polygon to 30 feet based in part on the maneuver.

In some examples, the planning component 624 may include a prediction component to generate predicted trajectories of objects (e.g., objects) in an environment. For example, a prediction component may generate one or more predicted trajectories for objects within a threshold distance from the vehicle 602. In some examples, the predicted trajectories may include any number of potential paths in which a detected object may travel from a current position (e.g., at the time of perception) and/or based on a direction of travel. In some examples, the predicted trajectories may represent a distance and direction in which the object will travel over a period of time. In some examples, a prediction component may measure a trace of an object and generate a trajectory for the object based on observed and predicted behavior. In various examples, the prediction component may determine predicted trajectories based on one or more of machine learning techniques, heat maps, temporal logic, and/or tree search methods.

In at least one example, the vehicle computing device(s) 604 may include one or more system controllers 626, which may be configured to control steering, propulsion, braking, safety, emitters, communication, and other systems of the vehicle 602. The system controller(s) 626 may communicate with and/or control corresponding systems of the drive system(s) 614 and/or other components of the vehicle 602.

The memory 618 may further include one or more maps 628 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 602 may be controlled based at least in part on the map(s) 628. That is, the map(s) 628 may be used in connection with the localization component 620, the perception component 622, and/or the planning component 624 to determine a location of the vehicle 602, detect objects in an environment, generate routes, determine actions and/or trajectories to navigate within an environment. In various examples, the map(s) 628 may include a road network. The road network may include one or more distinct road segments, such as road segments 118(1), 118(2), 118(3) . . . 118(N) of FIG. 1.

In some examples, the one or more maps 628 may be stored on one or more remote computing device(s) 634, such as in the map component 636, accessible via network(s) 638. In some examples, multiple maps 628 may be stored based on, for example, a characteristic (e.g., type of entity, time of day, day of week, season of the year, etc.). Storing multiple maps 628 may have similar memory requirements, but increase the speed at which data in a map may be accessed.

As illustrated in FIG. 6, the vehicle computing device(s) 604 may include a relevance determination component 630. The relevance determination component 630 may be configured to determine whether one or more objects, such as objects 104 of FIG. 1, are relevant to the vehicle 602. In various examples, the relevance determination component 630 may receive one or more characteristics associated with the detected object(s) from the perception component 622 and/or from the sensor system(s) 606. As discussed above, the characteristic(s) of the detected objects may include, but are not limited to a position (X, Y, Z), an orientation, an object type, a velocity of the object, an acceleration of the object, an extent of the object (size), etc.

In various examples, the relevance determination component 630 may receive one or more predicted trajectories of the object (e.g., direction of travel, speed, etc.) from the planning component 624, such as from the prediction component thereof. In some examples, the relevance determination component 630 may receive the path polygon from the planning component 624. In various examples, the relevance determination component 630 may receive the planned path from the planning component 624 and may be configured to determine the path polygon associated with the vehicle 602.

In some examples, the relevance determination component 630 may be configured to determine whether detected objects are relevant to the vehicle 602 based on the respective predicted trajectories and the path polygon associated with the vehicle 602. In such examples, the relevance determination component 630 may determine whether a predicted trajectory of an object may intersect the path polygon of the vehicle. Based on a determination that the predicted trajectory will intersect the path polygon, the relevance determination component 630 may determine that the respective object is relevant to the vehicle. In some examples, a determination that the object is relevant to the vehicle 602 may be based on the predicted trajectory intersecting the path polygon over a period of time. In such examples, the relevance determination component 630 may determine that the object with a velocity in a particular direction (e.g., based on the predicted trajectory) will travel a given distance over the period of time. Based on a determination that the given distance in the particular direction intersects at least a portion of the path polygon, the relevance determination component 630 may determine that the object is relevant to the vehicle.

In various examples, the relevance determination component 630 may determine whether the object and the vehicle share a road segment. As described above, the road segment may include a portion of a road with a unique identifier. For example, the road segment may include all lanes of travel in both directions on a particular road. For another example, a first road segment may include two lanes of travel in a first direction and a second road segment may include two lanes of travel in a second direction, such as on a road with a median barrier. For another example, the road segment may include lanes of a road and at least a portion of a pedestrian sidewalk, one or more bike lanes, or the like.

In various examples, the relevance determination component 630 may determine an initial (e.g., current) location of the object based on sensor data. The relevance determination component 630 may determine a road segment corresponding to the initial location of the object, such as based on data depicted in the map(s) 628. In various examples, the relevance determination component 630 may determine one or more road segments the object may travel on based on a trajectory associated therewith. In such examples, the relevance determination component 630 may determine a distance the object will travel along the trajectory over the period of time and may determine the one or more road segments associated with the trajectory. For example, the relevance determination component 630 may detect an object traveling on a first road and approaching a junction. The relevance determination component 630 may identify the road segment associated with the initial location of the object and one or more road segments associated with the junction. The relevance determination component 630 may compare the road segments associated with the object to the road segments associated with the vehicle to determine whether the vehicle and the object share at least one road segment over the time period.

Based on a determination that the vehicle and the object do not and will not share a road segment over the period of time, the relevance determination component 630 may determine that the object is irrelevant to the vehicle. Based on a determination that the vehicle and the object share and/or will share a road segment, the relevance determination component 630 may determine that the object is relevant to the vehicle.

In various examples, the relevance determination component 630 may be configured to determine whether an object is relevant to the vehicle 602 based on a determination of whether the vehicle and the object are operating on substantially the same plane (e.g., a substantially similar height, etc.). In some examples, the relevance determination component 630 may identify objects operating on substantially the same plane as the vehicle prior to determining whether the object may intersect the path polygon and/or the object and the vehicle share a road segment. In such examples, the determination that the object is operating on substantially the same plane as the vehicle may include an initial relevance determination. In various examples, the relevance determination component 630 may first determine that the object is relevant, such as based on a path polygon intersection and/or a shared road segment, and based on the initial determination of relevance, may verify relevance based on a height of the object (whether the object and the vehicle are operating on the same plane).

In various examples, the relevance determination component 630 may determine a height associated with a detected object. In such examples, the height may be based at least in part on sensor data. In various examples, the height may represent a vertical distance of the object from a surface of a road on which the vehicle is operating. In some examples, the height may represent a vertical distance of the object above or below the vehicle or a point thereon (e.g., a sensor height on the vehicle). In various examples, the relevance determination component 630 may determine the height, based on a detected elevation angle associated with an object and/or a detected distance from the vehicle to the object. In such examples, the relevance determination component 630 may be able to determine a height using a trigonometric function (e.g., $\sin \theta$). In various examples, the relevance determination component 630 may receive the height associated with the detected object from the perception component 622. In such examples, the perception component 622 may determine the height based on the angle and distance between the vehicle and the object and/or by associating a detected entity with a position in a map.

In some examples, the relevance determination component 630 may determine, based on the angle, that an object associated therewith is operating on substantially the same plane or a different plane from the vehicle. In some examples, a determination that the object is operating on the different plane may be based on the angle being equal to or greater than a first threshold angle (e.g., 30 degrees, 45 degrees, etc.). In some examples, a determination that the object is operating on substantially the same plane as the vehicle may be based on the angle being equal to or less than a second threshold angle (e.g., 5 degrees, 10 degrees, etc.).

In various examples, the relevance determination component 630 may determine, based on the height, that the corresponding object is operating on substantially the same or a different plane from the vehicle (e.g., different road segment, different altitude, etc.). In some examples, a determination that the object is operating on the different plane may be based on the height being equal to or greater than a threshold height. The threshold height may be a predetermined height indicative of a different plane, road segment, altitude, or the like. Based on the determination that the height is greater than the threshold height, the relevance determination component 630 may determine that the object is operating on a different plane from the vehicle.

In various examples, based on a determination that an object is operating on a different plane, the relevance determination component 630 may determine that the object is irrelevant to the vehicle. In some examples, based on a determination that an object is operating on substantially the same plane as the vehicle, the relevance determination component 630 may determine that the object is relevant to the vehicle. In at least some examples, a determination that an object is relevant may include a determination that the object and the vehicle share a road segment or that a trajectory associated with the object intersects a path polygon and a determination that the object and the vehicle are operating on substantially the same plane.

In some examples, the determination of whether detected objects are relevant to the vehicle 602 may be performed at random times during vehicle 602 operation (e.g., at 8 seconds, 30 seconds, etc.). In some examples, the relevance determination of whether detected objects are relevant to the vehicle 602 may be performed periodically during vehicle 602 operation. In such examples, the relevance determination component 630 may determine relevance of detected objects at periodic intervals (e.g., every 1.5 seconds, every 5 seconds, every 8 estimated states, every 16 estimated states, etc.). In some examples, the relevance may be determined based on computational resource availability (e.g., where more resources are needed, irrelevant entities may be disregarded for future operations).

Based on a determination that an object is relevant to the vehicle 602 at a time associated with a relevance determination, the relevance determination component 630 may continue to include data associated with the object in vehicle control planning considerations (e.g., vehicle control planning operations). Based on a determination that an object is not relevant to the vehicle at a time associated with a relevance determination, the relevance determination component 630 may disregard (omit) data associated with the object from vehicle control planning operations. In some examples, the relevance determination component 630 may determine that an object, previously determined to be relevant to the vehicle, has become irrelevant (e.g., no longer shares a road segment, trajectory does not intersect path polygon, not operating on substantially the same plane, etc.). Based on a determination that the irrelevant object was formerly relevant to the vehicle, the relevance determination component 630 may continue to consider data associated with the object for a second period of time (e.g., 5 seconds, 6 seconds, 10 seconds, etc.) after the object is determined to be irrelevant. In various examples, after the object has remained irrelevant for the second period of time and/or the second period of time passes, the relevance determination component 630 may omit data associated therewith in vehicle control planning considerations.

By removing the data associated with irrelevant objects from vehicle control planning operations, the relevance determination component 630 may increase an amount of memory and processing power available to the vehicle computing device(s) 604 for other calculations, programs, applications, etc. In some examples, the removal of data associated with the irrelevant object may increase processing speed related to relevance determinations corresponding to other objects in the environment. Accordingly, the techniques described herein may improve the functioning of the vehicle computing system.

As can be understood, the components discussed herein (e.g., the localization component 620, the perception component 622, the planning component 624, the one or more system controller(s) 626, the one or more maps 628, the relevance determination component 630 are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memory 618 (and the memory 632, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet60, ResNet101, VGG, DenseNet, PointNet, and the like.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device(s) 604. Additionally or in the alternative, the sensor system(s) 606 may send sensor data, via the one or more networks 638, to the one or more computing device(s) 634 at a particular frequency, after a lapse of a predetermined period of time, in near real-time, etc.

The vehicle 602 may also include one or more emitters 608 for emitting light and/or sound. The emitter(s) 608 may include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 may also include one or more communication connection(s) 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., computing device(s) 634, other nearby vehicles, etc.) and/or one or more remote sensor system(s) 640 for receiving sensor data.

The communications connection(s) 610 may include physical and/or logical interfaces for connecting the vehicle computing device(s) 604 to another computing device or a network, such as network(s) 638. For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include one or more drive systems 614. In some examples, the vehicle 602 may have a single drive system 614. In at least one example, if the vehicle 602 has multiple drive systems 614, individual drive system(s) 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage j unction, a high voltage cable, charging system, charge port, etc.). Additionally, the drive system(s) 614 may include a drive system controller which may receive and preprocess data from the sensor system(s) and to control operation of the various vehicle systems. In some examples, the drive system controller may include one or more processors and memory communicatively coupled with the one or more processors. The memory may store one or more systems to perform various functionalities of the drive system(s) 614. Furthermore, the drive system(s) 614 may also include one or more communication connection(s) that enable communication by the respective drive system with one or more other local or remote computing device(s).

In at least one example, the direct connection 612 may provide a physical interface to couple the one or more drive system(s) 614 with the body of the vehicle 602. For example, the direct connection 612 may allow the transfer of energy, fluids, air, data, etc. between the drive system(s) 614 and the vehicle. In some instances, the direct connection 612 may further releasably secure the drive system(s) 614 to the body of the vehicle 602.

In at least one example, the localization component 620, the perception component 622, the planning component 624, the one or more system controllers 626, the one or more maps 628, and the relevance determination component 630, may process sensor data, as described above, and may send their respective outputs, over the one or more networks 638, to the computing device(s) 634. In at least one example, the localization component 620, the perception component 622, the planning component 624, the one or more system controllers 626, the one or more maps 628, and the relevance determination component 630 may send their respective outputs to the computing device(s) 634 at a particular frequency, after a lapse of a predetermined period of time, in near real-time, etc.

In some examples, the vehicle 602 may send sensor data to the computing device(s) 634 via the network(s) 638. In some examples, the vehicle 602 may receive sensor data from the computing device(s) 634 and/or remote sensor system(s) 640, such as sensor system(s) 106, via the network(s) 638. The sensor data may include raw sensor data and/or processed sensor data and/or representations of sensor data. In some examples, the sensor data (raw or processed) may be sent and/or received as one or more log files.

The computing device(s) 634 may include one or more processors 642 and a memory 632 storing the map component 636 and a sensor data processing component 644. In some examples, the map component 636 may include functionality to generate maps of various resolutions. In such examples, the map component 636 may send one or more maps to the vehicle computing device(s) 604 for navigational purposes. In various examples, the sensor data processing component 644 may be configured to receive data from one or more remote sensors, such as sensor system(s) 606 and/or remote sensor system(s) 640. In some examples, the sensor data processing component 644 may be configured to process the data and send processed sensor data to the vehicle computing device(s) 604, such as for use by the relevance determination component 630. In some examples, the sensor data processing component 644 may be configured to send raw sensor data to the vehicle computing device(s) 604.

The processor(s) 616 of the vehicle 602 and the processor(s) 642 of the computing device(s) 634 may be any suitable processor capable of executing instructions to process data and perform operations as described herein. By way of example and not limitation, the processor(s) 616 and 642 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and 632 are examples of non-transitory computer-readable media. The memory 618 and 632 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 618 and 632 may include at least a working memory and a storage memory. For example, the working memory may be a high-speed memory of limited capacity (e.g., cache memory) that is used for storing data to be operated on by the processor(s) 616 and 642. In some instances, the memory 618 and 632 may include a storage memory that may be a lower-speed memory of relatively large capacity that is used for long-term storage of data. In some cases, the processor(s) 616 and 642 cannot operate directly on data that is stored in the storage memory, and data may need to be loaded into a working memory for performing operations based on the data, as discussed herein.

It should be noted that while FIG. 6 is illustrated as a distributed system, in alternative examples, components of the vehicle 602 may be associated with the computing device(s) 634 and/or components of the computing device(s) 634 may be associated with the vehicle 602. That is, the vehicle 602 may perform one or more of the functions associated with the computing device(s) 634, and vice versa.

EXAMPLE CLAUSES

A: A vehicle comprising: one or more sensors; one or more processors; and memory storing processor-executable instructions that, when executed by the one or more processors, configure the vehicle to: receive sensor data from the one or more sensors; identify a first object at a first position and a second object at a second position in an environment based at least in part on the sensor data; determine a first trajectory associated with the first object and a second trajectory associated with the second object; generate a path polygon corresponding to a planned path of the vehicle through the environment, wherein the path polygon comprises one or more road segments; determine that the first object is relevant to the vehicle based at least in part on at least one of: determining that the first trajectory intersects the path polygon; or determining that a first road segment associated with at least one of the first position or the first trajectory corresponds to a road segment of the one or more road segments; based at least in part on determining that the first object is relevant to the vehicle, control the vehicle at the inclusion of the first object; determine that the second object is irrelevant to the vehicle based at least in part on: determining that the second trajectory does not intersect the path polygon; and determining that a second road segment associated with at least one of the second position or the second trajectory differ from the one or more road segments associated with the vehicle; and based at least in part on determining that the second object is irrelevant to the vehicle, control the vehicle at the exclusion of the second object.

B: The vehicle as paragraph A describes, wherein determining that the first object is relevant to the vehicle is further based at least in part on: determining a height associated with the first object relative to the vehicle; and determining that the height is equal to or less than a threshold height.

C: The vehicle as either paragraph A or B describe, wherein the instructions further configure the vehicle to: identify a third object in the environment; determine a third trajectory associated with the third object; determine that the third trajectory intersects the path polygon; determine a height associated with the third object; determine that the height is equal to or greater than a threshold height; determine that the third object is irrelevant to the vehicle; and based at least in part on determining that the third object is irrelevant to the vehicle, control the vehicle at the exclusion of the third object.

D: The vehicle as any one of paragraphs A-C describe, wherein the instructions further configure the vehicle to: identify a third object located at a third position in the environment; determine a third trajectory associated with the third object; determine that a third road segment associated with the third trajectory corresponds to the road segment of the one or more road segments; determine a height associated with the third object relative to the vehicle; determine that the height is equal to or greater than a threshold height; determine that the third object is irrelevant to the vehicle based at least in part on the height being equal to or greater than the threshold height; and based at least in part on determining that the third object is irrelevant to the vehicle, control the vehicle at the exclusion of the third object.

E: The vehicle as any one of paragraphs A-D describe, wherein the instructions further program the one or more processors to: determine that the second object was previously relevant to the vehicle; and based at least in part on determining that the second object was previously relevant to the vehicle, control the vehicle at the inclusion of the second object for a period of time, wherein controlling of the vehicle at the exclusion of the second object occurs after the period of time expires.

F: A system or system implemented method as described in any one of paragraphs A-E.

G: A method comprising: receiving sensor data from one or more sensors; identifying an object at a position in an environment based at least in part on the sensor data; determining a trajectory associated with the object; generating a polygon of a vehicle based at least in part on a planned path of the vehicle through the environment; determining that the object is irrelevant to the vehicle based at least in part on at least one of: determining the trajectory does not intersect the path polygon; or determining that the object does not share a road segment with the vehicle.

H: The method as paragraph G describes, further comprising controlling the vehicle at the exclusion of the object.

I: The method as either of paragraph G or H describe, wherein determining that the object does not share the road segment with the vehicle comprises: determining a first road segment associated with the planned path of the vehicle; determining a second road segment corresponding to the position and the trajectory associated with the object; and determining that the first road segment differs from the second road segment.

J: The method as any one of paragraphs G-I describe, further comprising: determining a height associated with the object relative to the vehicle; and determining that the height is equal to or greater than a threshold height, wherein determining that the object is irrelevant to the vehicle is based at least in part on determining that the height is equal to or greater than the threshold height.

K: The method as any one of paragraphs G-J describe, wherein the trajectory is determined based at least in part on at least one of: a machine learning technique; a probabilistic heat map; a top-down prediction technique; a constant velocity associated with the object; a tree search algorithm; or a temporal logic formula.

L: The method as any one of paragraphs G-K describe, wherein a width of the polygon is based at least in part on one or more characteristics of one or more road segments associated with the planned path of the vehicle, the one or more characteristics comprising at least one of: a median barrier in a road corresponding to at least one of the one or more road segments; a number of turns in the road; a bike lane; proximity to a crosswalk; or proximity to a sidewalk.

M: The method as any one of paragraphs G-L describe, wherein determining that the object is irrelevant to the vehicle occurs at a second time, the method further comprising: identifying the object at a first time, the first time being before the second time, wherein the object is at a first position at the first time; determining a first trajectory associated with the object at the first time; determining that the object is relevant to the vehicle at the first time based at least in part on the polygon of the vehicle, the first position, and the first trajectory associated with the object; and controlling the vehicle based at least in part on determining that the object is relevant to the vehicle at the first time.

N: The method as paragraph M describes, further comprising: controlling the vehicle based at least in part on determining that the object is irrelevant to the vehicle at a third time after the second time.

O: The method as any one of paragraphs G-N describe, wherein the object is a first object, the position is a first position, and the trajectory is a first trajectory, the method further comprising: identifying a second object at a second position in the environment; determining a second trajectory associated with the second object; determining that the second object is relevant to the vehicle based at least in part on at least one of: determining that the second trajectory intersects the path polygon; or determining that a first road segment associated with the planned path of the vehicle is a same road segment as a second road segment associated with at least one of the second position or the second trajectory; and controlling the vehicle at the inclusion of the second object.

P: A system or device comprising: a processor; and a computer-readable medium coupled to the processor, the computer-readable medium including instructions to configure the processor to perform a computer-implemented method as any one of paragraphs G-O describe.

Q: A system or device comprising: a processor; and a computer-readable medium coupled to the processor, the computer-readable medium including instructions to configure the processor to perform a computer-implemented method as any one of paragraphs G-O describe.

R: A system or device comprising: a means for processing; and a means for storing coupled to the means for processing, the means for storing including instructions to configure one or more devices to perform a computer-implemented method as any of paragraphs G-O describe.

S: A computer-readable medium having thereon computer-executable instructions that, responsive to execution, configure a computer to perform a method as any one of paragraphs G-O describe.

T: A non-transitory computer-readable medium storing instructions that, when executed, cause one or more processors to perform operations comprising: receiving sensor data from one or more sensors; identifying an object at a position in an environment based at least in part on the sensor data; determining a trajectory associated with the object; generating a path polygon of a vehicle based at least in part on a planned path of the vehicle through the environment; determining that the object is irrelevant to the vehicle based at least in part on at least one of: determining the trajectory does not intersect the path polygon; or determining that the object does not share a road segment with the vehicle.

U: The non-transitory computer-readable medium as paragraph T describes, the operations further comprising: controlling the vehicle based at least in part on determining that the object is irrelevant to the vehicle.

V: The non-transitory computer-readable medium as either of paragraphs T or U describe, wherein determining that the object does not share the road segment with the vehicle comprises: determining a first road segment associated with the planned path of the vehicle; determining a second road segment corresponding to the position and the trajectory associated with the object; and determining that the first road segment differs from the second road segment, wherein determining that the object is irrelevant to the vehicle is based at least in part on determining that the first road segment differs from the second road segment.

W: The non-transitory computer-readable medium as any one of paragraphs T-V describe, the operations further comprising: determining a height associated with the object relative to the vehicle; and determining that the height is equal to or greater than an absolute value associated with a threshold height, wherein determining that the object is irrelevant to the vehicle is based at least in part on determining that the height is equal to or greater than the absolute value associated with a threshold height.

X: The non-transitory computer-readable medium as any one of paragraphs T-W describe, wherein determining that the object is irrelevant to the vehicle occurs at a second time, the operations further comprising: identifying the object at a first time, the first time being before the second time, wherein the object is at a first position at the first time; determining a first trajectory associated with the object at the first time; determining that the object is relevant to the vehicle at the first time based at least in part on the path polygon of the vehicle, the first position, and the first trajectory associated with the object; controlling the vehicle at the inclusion of the object based at least in part on determining that the object is relevant to the vehicle; and controlling the vehicle at the exclusion of the object based at least in part on determining that the object is irrelevant to the vehicle at a third time after the second time.

Y: The non-transitory computer-readable medium as any one of paragraphs T-X describe, wherein the object is a first object, the position is a first position, and the trajectory is a first trajectory, the operations further comprising: identifying a second object at a second position in the environment; determining a second trajectory associated with the second object; determining that the second object is relevant to the vehicle based at least in part on at least one of: determining that the second trajectory intersects the path polygon; or determining that a first road segment associated with the planned path of the vehicle is a same road segment as a second road segment associated with at least one of the second position or the second trajectory; and controlling the vehicle based at least in part on the second object.

Z: A system or device comprising: a processor; and the non-transitory computer-readable medium as any of paragraphs T-Y describe coupled to the processor.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle comprising:
   one or more sensors;
   one or more processors; and
   memory storing processor-executable instructions that, when executed by the one or more processors, configure the vehicle to:
   receive sensor data from the one or more sensors;
   identify a first object at a first position and a second object at a second position in an environment based at least in part on the sensor data;
   determine a first trajectory associated with the first object and a second trajectory associated with the second object;
   generate a path polygon corresponding to a planned path of the vehicle through the environment, wherein the path polygon occupies at least a portion of one or more road segments and is defined at least by:
      a length dimension based at least in part on a first distance along the planned path that the vehicle will traverse over a predetermined time period and a second distance behind the vehicle; and
      a variable width dimension determined based at least in part on presence of a sidewalk or crosswalk within a threshold distance to the one or more road segments;
   determine that the first object is relevant to the vehicle based at least in part on at least one of:
      determining that the first trajectory intersects the path polygon; or determining that a first road segment associated with at least one of the first position or the first trajectory corresponds to a road segment of the one or more road segments occupied by the path polygon without intersecting the planned path;
   based at least in part on determining that the first object is relevant to the vehicle, control the vehicle at the inclusion of the first object;
   determine that the second object is irrelevant to the vehicle based at least in part on:
      determining that the second trajectory does not intersect the path polygon; and
      determining that a second road segment associated with at least one of the second position or the second trajectory differ from the one or more road segments associated with the vehicle; and
   based at least in part on determining that the second object is irrelevant to the vehicle, control the vehicle at the exclusion of the second object and disregard data associated with the second object from subsequent control determinations.

2. The vehicle as claim 1 recites, wherein determining that the first object is relevant to the vehicle is further based at least in part on:
   determining a height associated with the first object relative to the vehicle; and
   determining that the height is equal to or less than a threshold height.

3. The vehicle as claim 1 recites, wherein the instructions further configure the vehicle to:
   identify a third object in the environment;
   determine a third trajectory associated with the third object;
   determine that the third trajectory intersects the path polygon;
   determine a height associated with the third object;
   determine that the height is equal to or greater than a threshold height;
   determine that the third object is irrelevant to the vehicle; and
   based at least in part on determining that the third object is irrelevant to the vehicle, control the vehicle at the exclusion of the third object.

4. The vehicle as claim 1 recites, wherein the instructions further configure the vehicle to:
   identify a third object located at a third position in the environment;
   determine a third trajectory associated with the third object;
   determine that a third road segment associated with the third trajectory corresponds to the road segment of the one or more road segments;
   determine a height associated with the third object relative to the vehicle;

determine that the height is equal to or greater than a threshold height;
determine that the third object is irrelevant to the vehicle based at least in part on the height being equal to or greater than the threshold height; and
based at least in part on determining that the third object is irrelevant to the vehicle, control the vehicle at the exclusion of the third object.

5. The vehicle as claim 1 recites, wherein the instructions further program the one or more processors to:
determine that the second object was previously relevant to the vehicle; and
based at least in part on determining that the second object was previously relevant to the vehicle, control the vehicle at the inclusion of the second object for a period of time,
wherein controlling of the vehicle at the exclusion of the second object occurs after the period of time expires.

6. A method comprising:
receiving sensor data from one or more sensors;
identifying an object at a position in an environment based at least in part on the sensor data;
determining a trajectory associated with the object;
generating a path polygon of a vehicle based at least in part on a planned path of the vehicle through the environment, wherein:
the path polygon occupies at least a portion of one or more road segments;
a length dimension of the path polygon is determined based at least in part on a first distance along the planned path that the vehicle will traverse over a predetermined time period and a second distance behind the vehicle; and
a variable width dimension of the path polygon is determined based at least in part on presence of a navigable surface within a threshold distance for objects adjacent to and separate from a vehicle lane of the one or more road segments;
determining, based at least in part on available computing resources, that the object is irrelevant to the vehicle based at least in part on at least one of:
determining the trajectory does not intersect the path polygon; or
determining that the position of the object is not within the path polygon or occupy a road segment of the one or more road segments.

7. The method as claim 6 recites, further comprising controlling the vehicle at the exclusion of the object.

8. The method as claim 6 recites, wherein determining that the position of the object is not within the path polygon or occupy the road segment comprises:
determining a first road segment associated with the planned path of the vehicle;
determining a second road segment corresponding to the position and the trajectory associated with the object; and
determining that the first road segment differs from the second road segment.

9. The method as claim 6 recites, further comprising:
determining a height associated with the object relative to the vehicle; and
determining that the height is equal to or greater than a threshold height,
wherein determining that the object is irrelevant to the vehicle is based at least in part on determining that the height is equal to or greater than the threshold height.

10. The method as claim 6 recites, wherein the trajectory is determined based at least in part on at least one of:
a machine learning technique;
a probabilistic heat map;
a top-down prediction technique;
a constant velocity associated with the object;
a tree search algorithm; or
a temporal logic formula.

11. The method as claim 6 recites, wherein the variable width dimension of the path polygon is further determined based at least in part on at least one of:
a bike lane associated with the road segment;
a proximity of the one or more road segments to a crosswalk; or
a proximity of the one or more road segments to a sidewalk.

12. The method as claim 6 recites, wherein determining that the object is irrelevant to the vehicle occurs at a second time, the method further comprising:
identifying the object at a first time, the first time being before the second time, wherein the object is at a first position at the first time;
determining a first trajectory associated with the object at the first time;
determining that the object is relevant to the vehicle at the first time based at least in part on the path polygon of the vehicle, the first position, and the first trajectory associated with the object; and
controlling the vehicle based at least in part on determining that the object is relevant to the vehicle at the first time.

13. The method as claim 12 recites, further comprising:
controlling the vehicle based at least in part on determining that the object is irrelevant to the vehicle at a third time after the second time.

14. The method as claim 6 recites, wherein the object is a first object, the position is a first position, and the trajectory is a first trajectory, the method further comprising:
identifying a second object at a second position in the environment;
determining a second trajectory associated with the second object;
determining that the second object is relevant to the vehicle based at least in part on at least one of:
determining that the second trajectory intersects the path polygon; or
determining that a first road segment associated with the planned path of the vehicle is a same road segment as a second road segment associated with at least one of the second position or the second trajectory; and
controlling the vehicle at the inclusion of the second object.

15. A non-transitory computer-readable medium storing instructions that, when executed, cause one or more processors to perform operations comprising:
receiving sensor data from one or more sensors;
identifying an object at a position in an environment based at least in part on the sensor data;
determining a trajectory associated with the object;
generating a path polygon of a vehicle based at least in part on a planned path of the vehicle through the environment, wherein:
the path polygon occupies one or more road segments,
the path polygon includes a length dimension based at least in part on a first distance along the planned path that the vehicle will traverse over a predetermined time period and a second distance behind the vehicle; and the path polygon includes a variable width dimension determined based at least in part on presence of a navigable surface within a threshold distance for objects adjacent to and separate from a vehicle lane of the one or more road segments; and determining that the object is irrelevant to the vehicle based at least in part on at least one of:

determining the trajectory does not intersect the path polygon; or determining that the object does not share a road segment of the one or more road segments.

16. The non-transitory computer-readable medium of claim 15, the operations further comprising:

controlling the vehicle based at least in part on determining that the object is irrelevant to the vehicle.

17. The non-transitory computer-readable medium of claim 15, wherein determining that the object does not share the road segment with the vehicle comprises:

determining a first road segment associated with the planned path of the vehicle;

determining a second road segment corresponding to the position and the trajectory associated with the object; and determining that the first road segment differs from the second road segment, wherein determining that the object is irrelevant to the vehicle is based at least in part on determining that the first road segment differs from the second road segment.

18. The non-transitory computer-readable medium of claim 15, the operations further comprising:

determining a height associated with the object relative to the vehicle; and determining that the height is equal to or greater than an absolute value associated with a threshold height, wherein determining that the object is irrelevant to the vehicle is based at least in part on determining that the height is equal to or greater than the absolute value associated with a threshold height.

19. The non-transitory computer-readable medium of claim 15, wherein determining that the object is irrelevant to the vehicle occurs at a second time, the operations further comprising:

identifying the object at a first time, the first time being before the second time, wherein the object is at a first position at the first time;

determining a first trajectory associated with the object at the first time;

determining that the object is relevant to the vehicle at the first time based at least in part on the path polygon of the vehicle, the first position, and the first trajectory associated with the object;

controlling the vehicle at the inclusion of the object based at least in part on determining that the object is relevant to the vehicle; and controlling the vehicle at the exclusion of the object based at least in part on determining that the object is irrelevant to the vehicle at a third time after the second time.

20. The non-transitory computer-readable medium of claim 15, wherein the object is a first object, the position is a first position, and the trajectory is a first trajectory, the operations further comprising:

identifying a second object at a second position in the environment;

determining a second trajectory associated with the second object;

determining that the second object is relevant to the vehicle based at least in part on at least one of:

determining that the second trajectory intersects the path polygon; or determining that a first road segment associated with the planned path of the vehicle is a same road segment as a second road segment associated with at least one of the second position or the second trajectory; and controlling the vehicle based at least in part on the second object.

* * * * *